(12) United States Patent
Donderici et al.

(10) Patent No.: US 10,145,231 B2
(45) Date of Patent: Dec. 4, 2018

(54) SURFACE EXCITATION RANGING SYSTEM FOR SAGD APPLICATION

(71) Applicant: Halliburton Energy Services, Inc., Houston, TX (US)

(72) Inventors: Burkay Donderici, Houston, TX (US); Clinton Moss, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 527 days.

(21) Appl. No.: 14/442,356

(22) PCT Filed: Dec. 6, 2013

(86) PCT No.: PCT/US2013/073521
§ 371 (c)(1),
(2) Date: May 12, 2015

(87) PCT Pub. No.: WO2014/089402
PCT Pub. Date: Jun. 12, 2014

(65) Prior Publication Data
US 2016/0273337 A1    Sep. 22, 2016

Related U.S. Application Data

(60) Provisional application No. 61/735,445, filed on Dec. 10, 2012, provisional application No. 61/734,740, filed on Dec. 7, 2012.

(51) Int. Cl.
E21B 47/022    (2012.01)
E21B 7/04    (2006.01)
(Continued)

(52) U.S. Cl.
CPC .......... *E21B 47/02216* (2013.01); *E21B 7/04* (2013.01); *E21B 47/024* (2013.01); *G01V 3/26* (2013.01); *E21B 43/2406* (2013.01)

(58) Field of Classification Search
None
See application file for complete search history.

(56) References Cited

U.S. PATENT DOCUMENTS

| | | | |
|---|---|---|---|
| 2,729,784 A * | 1/1956 | Fearon | G01V 3/24 |
| | | | 324/368 |
| 4,323,848 A | 4/1982 | Kuckes | |

(Continued)

OTHER PUBLICATIONS

International Search Report and The Written Opinion of the International Searching Authority, or the Declaration, dated Jul. 8, 2014, PCT/US2013/073521, 13 pages, ISA/US.

(Continued)

*Primary Examiner* — Shane Bomar
(74) *Attorney, Agent, or Firm* — Haynes and Boone, LLP

(57) ABSTRACT

A system for ranging between two wellbores where an emitter electrode and return electrode of a current injection system are disposed to drive a current to a conductive member within a target wellbore to create an electromagnetic field about the conductive member. The electromagnetic field is measured utilizing a sensor disposed in an investigative wellbore, which may be in the process of being drilled. In some embodiments, the emitter electrode and return electrode are positioned on the surface of a formation, spaced apart from one another with locations on the surface selected to optimize current, and therefore, the electromagnetic field, at a desired point along the conductive member. In some embodiments, one or both of the emitter electrode and return electrode are positioned in the target wellbore.

28 Claims, 15 Drawing Sheets

(51) Int. Cl.
*E21B 47/024* (2006.01)
*G01V 3/26* (2006.01)
*E21B 43/24* (2006.01)

(56) References Cited

U.S. PATENT DOCUMENTS

| | | | |
|---|---|---|---|
| 4,372,398 A | | 2/1983 | Kuckes |
| 4,700,142 A | * | 10/1987 | Kuckes ................. E21B 47/022 166/66.5 |
| 4,933,640 A | | 6/1990 | Kuckes |
| 5,064,006 A | | 11/1991 | Waters et al. |
| 5,218,301 A | | 6/1993 | Kuckes |
| 5,543,715 A | * | 8/1996 | Singer ...................... G01V 3/24 324/368 |
| 5,589,775 A | | 12/1996 | Kuckes |
| 5,676,212 A | | 10/1997 | Kuckes |
| 5,923,170 A | | 7/1999 | Kuckes |
| 6,603,314 B1 | * | 8/2003 | Kostelnicek ............. G01V 3/24 324/368 |
| 7,812,610 B2 | | 10/2010 | Clark et al. |
| 8,113,298 B2 | | 2/2012 | Kuckes |
| 2003/0038634 A1 | * | 2/2003 | Strack .................... G01V 11/00 324/323 |
| 2007/0278008 A1 | | 2/2007 | Kuckes et al. |
| 2008/0105427 A1 | | 5/2008 | Hampton et al. |
| 2009/0178850 A1 | | 7/2009 | Waters et al. |
| 2009/0272578 A1 | * | 11/2009 | MacDonald ........... C10G 21/22 175/26 |
| 2010/0044108 A1 | | 2/2010 | Bespalov et al. |
| 2010/0155138 A1 | | 6/2010 | Kuckes |
| 2010/0155139 A1 | | 6/2010 | Kuckes |
| 2011/0133741 A1 | * | 6/2011 | Clark ...................... E21B 7/046 324/345 |
| 2011/0139507 A1 | | 6/2011 | Krueger et al. |
| 2011/0174539 A1 | | 7/2011 | Brune et al. |
| 2011/0308859 A1 | | 12/2011 | Bittar et al. |
| 2012/0109527 A1 | | 5/2012 | Bespalov |
| 2012/0193144 A1 | | 8/2012 | Hallundbaek et al. |
| 2013/0319659 A1 | * | 12/2013 | Freedman ................ E21B 7/04 166/250.01 |

OTHER PUBLICATIONS

European Extended Search Report issued for EP 13861395.5, dated Jun. 28, 2016, 7 pages.
Russian Office Action issued for Russian Patent Application No. 2015121727, dated Oct. 6, 2017, 8 pages.

* cited by examiner

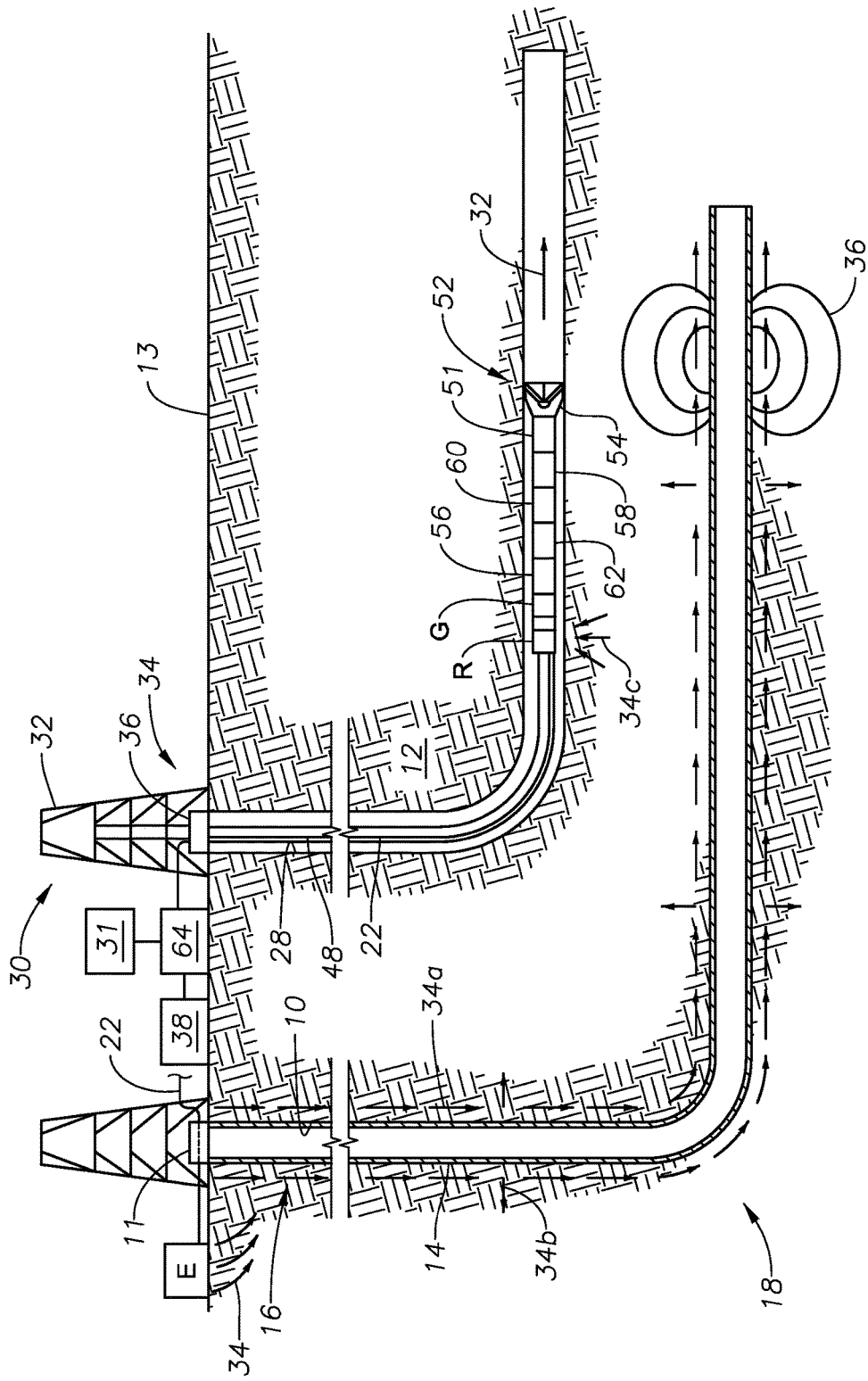

SURFACE EXCITATION RANGING SYSTEM FOR SAGD APPLICATION

PRIORITY

The present application is a U.S. National Stage patent application of International Patent Application No. PCT/US2013/073521, filed on Dec. 6, 2013, which claims priority to U.S. Provisional Application No. 61/734,740 entitled, "Surface Excitation Ranging System for SAGD Application," filed Dec. 7, 2012, and U.S. Provisional Application No. 61/735,445 entitled, "Surface Excitation Ranging System for SAGD Application," filed Dec. 10, 2012, the disclosures of which are hereby incorporated by reference in their entirety.

This application claims priority to U.S. Provisional Application No. 61/734,740 entitled, "Surface Excitation Ranging System for SAGD Application," filed Dec. 7, 2012, and U.S. Provisional Application No. 61/735,445 entitled, "Surface Excitation Ranging System for SAGD Application," filed Dec. 10, 2012, the disclosures of which are hereby incorporated by reference in their entirety.

FIELD OF THE INVENTION

The invention relates to wellbore drilling operations, and more particularly to methods and systems for tracking the drilling of multiple wellbores relative to one another. Most particularly, the invention relates to methods and systems for determining the relative location of a reference wellbore from a wellbore being drilled utilizing optimized placement of emitter electrodes and return electrodes to enhance magnetic ranging.

BACKGROUND OF THE INVENTION

As easy-to-access and easy-to-produce hydrocarbon resources are depleted, there is an increased demand for more advanced recovery procedures. One such procedure is steam assisted gravity drainage (SAGD), a procedure that utilizes steam in conjunction with two spaced apart wellbores. Specifically, SAGD addresses the mobility problem of heavy oil in a formation through the injection of high pressure, high temperature steam into the formation. This high pressure, high temperature steam reduces the viscosity of the heavy oil in order to enhance extraction. The injection of steam into the formation occurs from a first wellbore (injector) that is drilled above and parallel to a second wellbore (producer). As the viscosity of the heavy oil in the formation around the first wellbore is reduced, the heavy oil drains into the lower second wellbore, from which the oil is extracted. Typically, the two wellbores are drilled at a distance of only a few meters from one other. The placement of the injector wellbore needs to be achieved with very small margin in distance. If the injector wellbore is positioned too close to the producer wellbore, the producing wellbore would be exposed to very high pressure and temperature. If the injector wellbore is positioned too far from the producer wellbore, the efficiency of the SAGD process is reduced. In order to assist in ensuring that the second wellbore is drilled and positioned as desired relative to the first wellbore, a survey of the two wellbores in the formation is often conducted. These surveying techniques are traditionally referred to as "ranging".

Electromagnetic (EM) systems and methods are commonly employed in ranging to determine direction and distance between two wellbores. In EM ranging systems, an elongated conductive pipe string, such as the wellbore casing, is disposed in one of the wellbores. This wellbore is typically referred to as the "target" wellbore and usually represents the SAGD injector wellbore. In any event, a current is applied to the target wellbore conductive pipe string by a low-frequency current source. Currents flow along the wellbore casing and leak into the formation. The currents result in an EM field around the target wellbore. The EM fields from the currents on the target wellbore casing are measured using an electromagnetic field sensor system disposed in the other wellbore, which is typically the wellbore in the process of being drilled. This second wellbore usually represents the SAGD producer wellbore. The measured magnetic field can then be utilized to determine distance, direction and angle between two wellbores. Ranging systems in which a current is injected into the target wellbore in order to induce a magnetic field are referred to as "active" ranging systems.

One solution that has been employed in EM ranging is to use ranging devices to directly sense and measure the distance between two wells as the latter wellbore is drilled. Two wellbore-known commercial approaches that employ equipment in both wells (injector and producer) are based either on rotating magnets or magnetic guidance techniques. However, these approaches are undesirable in that they require two separate and different teams to manage the equipment in each wellbore, namely, a wireline team at the producer wellbore and a logging while drilling team at the injector wellbore, which is not cost effective. One prior art approach utilizes equipment in only a single wellbore (the injector wellbore) to transmit a current to a target wellbore (the producer wellbore), after which an absolute magnetic field measurement is used to calculate distance. One significant drawback to this method is that the approach tends to yield very unreliable results because of the placement of the emitter and return electrodes relative to one another and relative to a magnetometer.

BRIEF DESCRIPTION OF THE DRAWINGS

FIG. 3c illustrates an embodiment of the invention where a source delivers a current to a target wellbore and utilizes a grounded return in the injector wellbore.

DETAILED DESCRIPTION

Figure 1A:
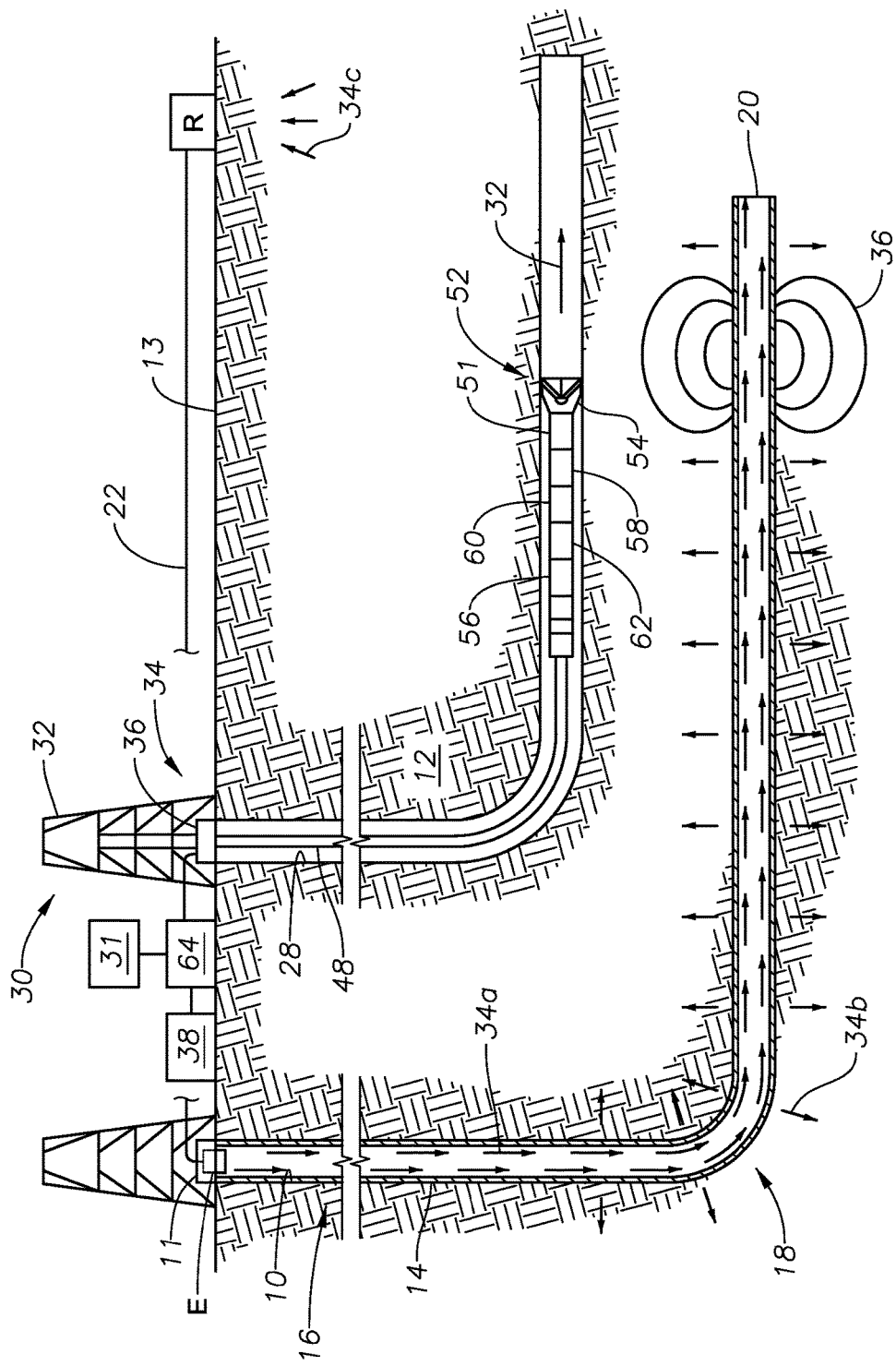
FIG. 1 illustrates surface-excitation of a target wellbore in a single wellbore ranging system

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1B:
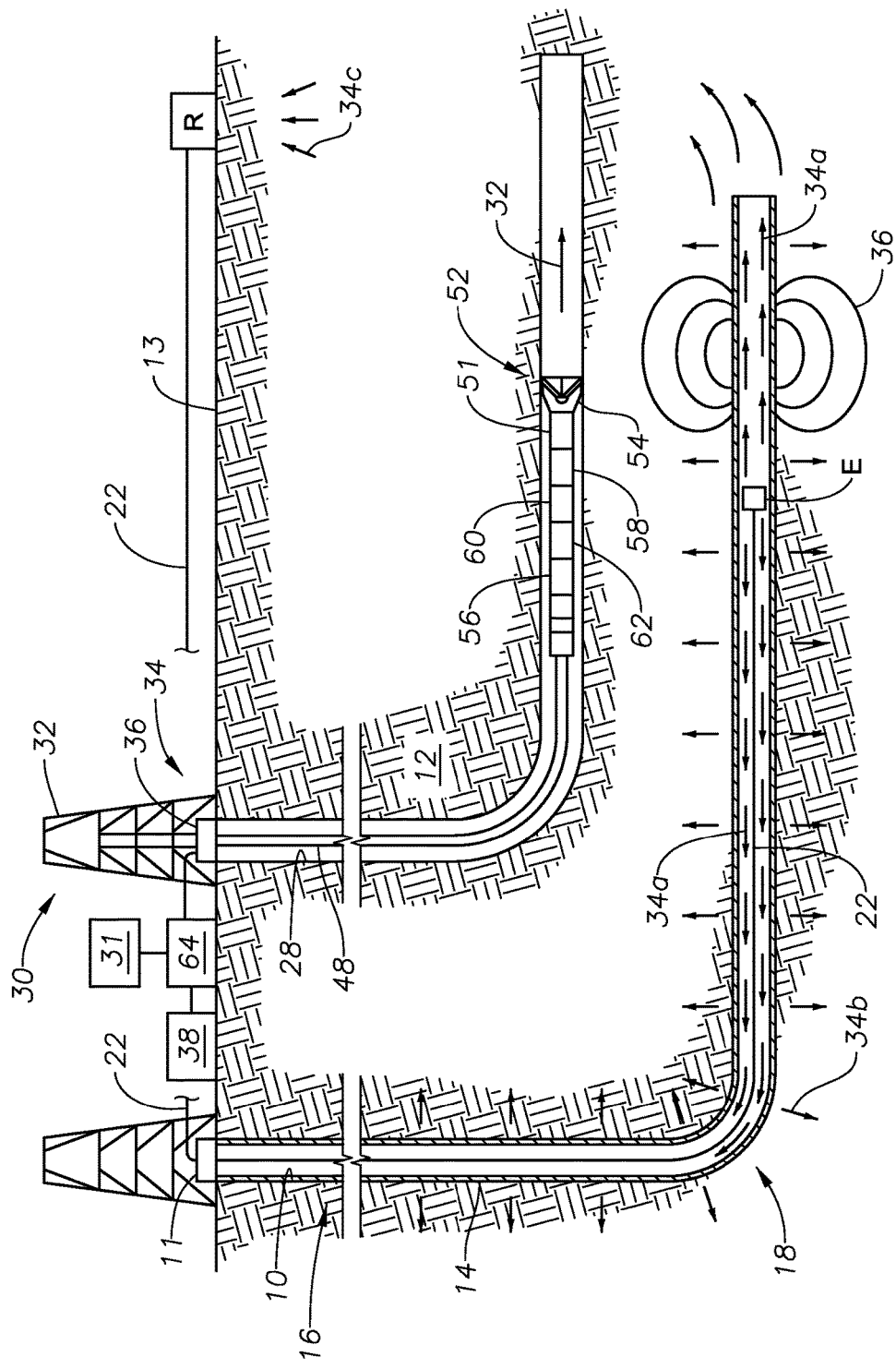

Referring initially to FIGS. 1a and 1b, a first wellbore 10 extends from a wellhead 11 into a formation 12 from the surface 13 of the formation. Disposed within wellbore 10 along at least a portion of its length is an elongated conductive member 14, which is generally oriented within wellbore 10 to be axially aligned therewith. Wellbore 10 may be cased or uncased. To the extent wellbore 10 is cased, in some embodiments, conductive member 14 may be a casing or liner disposed within wellbore 10. For either cased or uncased wellbores, in some embodiments, conductive member 14 may be a pipe string, tool string, tubing, electrical wire or other conductive body disposed in first wellbore 10. In any event, the intent is to provide a path for current flow along a substantial length of a reference wellbore, and any conduction path that serves this purpose can be used. Moreover, conductive member 14 is generally disposed within wellbore 10 to radiate a magnetic field radially outward from wellbore 10.

In some embodiments, first wellbore 10 may include a vertical section 16 and a directional section 18. The directional section 18 is drilled from the vertical section 16 along a desired azimuthal path and a desired inclination path.

A second wellbore 28 shown in the process of being drilled. A drilling system 30 is generally shown associated therewith. Drilling system 30 may include a drilling platform 32 positioned over formation 12, and a wellhead installation 34, including blowout preventers 36. Platform 32 may be disposed for raising and lowering a conveyance mechanism 48 within second wellbore 28. Conveyance mechanism 48 may be tubing, a pipe string such as a drill string, or a cable, such as a wireline, slickline or the like, depending on the operation being conducted within second wellbore 28.

Carried by conveyance mechanism 48 in second wellbore 28 is an electromagnetic ("EM") sensor 51. In some embodiments, the EM sensor 51 can measure at least one component of a magnetic field or the gradient of a magnetic field. In some embodiments, the EM sensor 51 can measure at least one component of an electric field or the gradient of an electric field. In some embodiments, EM sensor 51 includes at least a magnetic gradient sensor or magnetic gradiometer (receiver).

A current injection system for driving current to conductive member 14 includes at least one pair of electrodes, namely an emitter "E" electrode and a return "R". Emitter electrode E and return electrode R, together with the current injection system generally form a wellbore ranging system. The current injection system, namely emitter electrode E and return electrode R, injects alternating currents (AC) into formation 12 which currents travel to and then along conductive member 14 in first wellbore 10. EM sensor 51 is disposed within the second wellbore 28 to sense the magnetic fields due to these AC currents on the conductive member 14. In any event, distance and direction to target can be calculated by analyzing the measured magnetic fields. In some embodiments where EM sensor 51 comprises a gradiometer, the gradient of a magnetic field may be measured and utilized to determine the range between the wellbores.

To the extent drilling system 30 is being utilized to actively drill second wellbore 28, EM sensor 51 may be part of the bottom-hole-assembly (BHA) 52 of a drilling system. In such embodiments, conveyance mechanism 48 may be a tubing or drill string, having a BHA 52 attached to the end of string 48. BHA 52 includes a drill bit 54. In one or more embodiments, EM sensor 51 can be positioned proximate or adjacent drill bit 54. BHA may also include a power module 56, such as a mud motor, a steering module 58, a control module 60, and other sensors and instrumentation modules 62. As will be appreciated by persons of skill in the art, the BHA 52 illustrated in FIGS. 1a and 1b may be a measurement-while-drilling or logging-while-drilling system in which EM ranging can be utilized to guide drill bit 54 while a drill string is deployed in wellbore 28.

The current injection system also includes either a voltage controlled or current controlled transmitter 38, and in some embodiments, alternates as very low frequencies in the order of 0.02-250 Hz to generate the current injected by emitter electrode E. Transmitter 38 may be locally positioned relative to emitter electrode E, or positioned at a location removed from emitter electrode E in electrical contact with electrode E via conductive wiring. Likewise, power and communications to EM sensor 51 may be carried locally by appropriate modules 56-62 or may be transmitted via conveyance system 48.

The mud motor module 56 is driven by the drilling fluid flow, and in turn it drives the drill bit 54 to extend the second wellbore 28 along a desired path 32. Desired path 32 is shown as running parallel to the horizontal portion of wellbore 10 because in many cases, such as steam-assisted gravity drainage (SAGD) or coal bed degasification, it is desirable to drill a series of closely-spaced parallel wells. Mud motor module 56 may provide power to the current injection system and/or the EM sensor 51.

Steering module 58 enables the wellbore 28 to be extended in a desired direction. Many suitable steering mechanisms are well known, e.g., steering vanes, "bent sub" assemblies, and rotary steerable systems. The steering mechanism configuration can be set and adjusted by commands from a control system 64 at the surface, such as a logging truck or other control skid. Alternatively, control module 60 can be programmed with a desired route, and it can adjust the steering mechanism as needed to direct the wellbore along the desired path.

While the current injection system and EM sensor 51 as described herein are illustrated with respect to land-based drilling systems, the disclosure also includes use with offshore and marine drilling system.

Moreover, deployment of the current injection system and EM sensor 51 is not limited to any particular orientation of the first and second wellbores. As depicted in FIG. 1, first and second wellbores 10, 28, respectively are substantially horizontal wellbores. In such case, current injection system and EM sensor 51 may be particularly useful in ranging for SAGD operations.

Alternatively, first and second wellbores 10, 28, respectively are substantially vertical wellbores. Thus, current injection system and EM sensor 51 may be used in drilling relief wells or intersecting wells, such as when it is desirable to establish direct fluid communication between two wells. This may be particularly useful in wellbore intervention operations, for example.

In any event, a control system 31 may also be deployed to control drilling system 30 based on EM ranging utilizing current injection system and EM sensor 51.

Thus, a wellbore ranging system consists of two parts: (i) a source of current, namely a current injection system comprised of an emitter electrode E and return electrode R spaced apart from emitter electrode E, the separation of the emitter electrode E and the return electrode R selected to drive alternating currents (AC) from emitter electrode E, along conductive member 14 in first wellbore 10 and back to return electrode R, and (ii) an EM sensor 51, namely a magnetic gradient sensor or magnetic gradiometer or a magnetometer, positioned within the investigative or second wellbore and disposed to sense magnetic fields or the gradient magnetic fields due to these AC currents on the conductive member 14. While the system and method of the invention are not limited to a particular magnetic field measurement, in one embodiment, either the absolute magnetic field or the gradient is measured, while in another embodiment, both are measured. Distance and direction to target can be calculated by analyzing the measured magnetic fields. The emitter electrode E is positioned at a point near the surface or at a fixed point in the target wellbore. The return electrode R is positioned at or near the surface or within the formation, but in either case, spaced apart from the emitter electrode E so that currents flowing from emitter electrode E to return electrode R encounter or are otherwise first driven to the conductive member 14 within first wellbore 10.

FIG. 1a illustrates a current injection system where the emitter electrode E is located at the surface 13, proximate or adjacent first wellbore 10, while return electrode R is positioned along the surface 13 at a distance spaced apart from emitter electrode R, as well as first wellbore 10. In some embodiments, emitter electrode E is electrically attached to wellhead 11 to facilitate conduction of current to conductive member 14. An insulated conductive wire 22 joins return electrode R and emitter electrode E to complete an electrical circuit. As such, current injected at emitter electrode E travels down and along conductive member 14, as illustrated by current lines 34a. While a portion of the current will leak into formation 12 as shown by current lines 34b, most of current 34a will travel along conductive member 14, thereby resulting in an electromagnetic field 36 emanating from conductive member 14. Return electrode R is positioned on the surface so that current 34a that travels along conductive member will then pass through the formation 12 back to return electrode R as shown by current lines 34c, thus completing the circuit. Based on the location of wellbore 10, current within wellbore 10 can be optimized by adjusting the relative placement of the emitter electrode E and the return electrode R. In some embodiments, as illustrated in FIG. 1a, the return electrode R is positioned on the surface 13 proximate or adjacent to or past the distal end 20 of the first wellbore 10 in order to ensure that the current 34a will travel along the conductive member 14 disposed therein before passing through the formation 12 back to the return electrode R.

FIG. 1b illustrates a current injection system where the emitter electrode E is located within first wellbore 10, while return electrode R is positioned along the surface 13 at a distance spaced apart from emitter electrode R, as well as first wellbore 10. In some embodiments, emitter electrode E is electrically attached to conductive member 14 to facilitate conduction of current to conductive member 14. An insulated conductive wire 22 joins return electrode R and emitter electrode E to complete an electrical circuit. As such, current injected at emitter electrode E travels along conductive member 14, as illustrated by current lines 34a. While a portion of the current will leak into formation 12 as shown by current lines 34b, most of current 34a will travel along conductive member 14, thereby resulting in an electromagnetic field 36 emanating from conductive member 14. Return electrode R is positioned on the surface so that current 34a that travels along conductive member will then pass through the formation 12 back to return electrode R as shown by current lines 34c, thus completing the circuit. Based on the location of wellbore 10, current within wellbore 10 can be optimized by adjusting the relative placement of the emitter electrode E and the return electrode R. In some embodiments, as illustrated in FIG. 1b, the return electrode R is positioned on the surface 13 proximate or adjacent to or past the distal end 20 of the first wellbore 10 in order to ensure that the current 34a will travel along the conductive member 14 disposed therein before passing through the formation 12 back to the return electrode R.

Figure 2B:
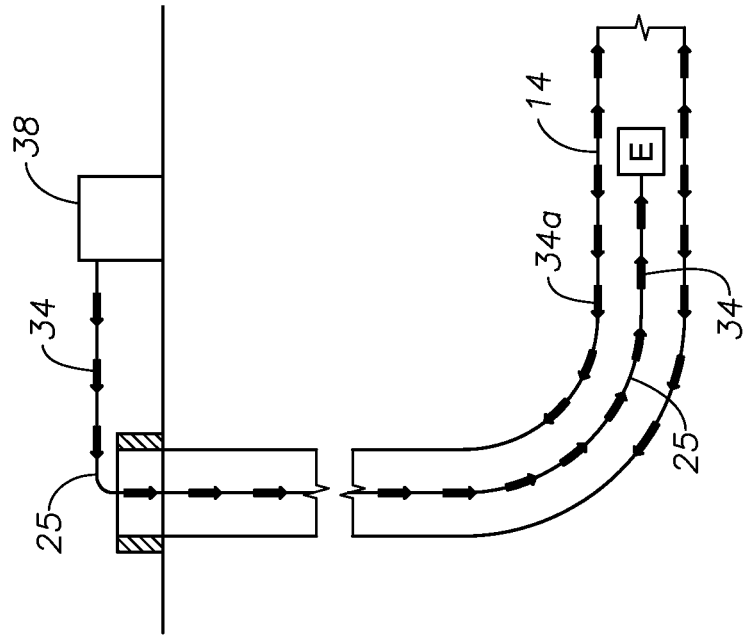
FIG. 2 illustrates a wellhead and pipe excitation configurations for the systems of FIG. 1.
Figure 2A:
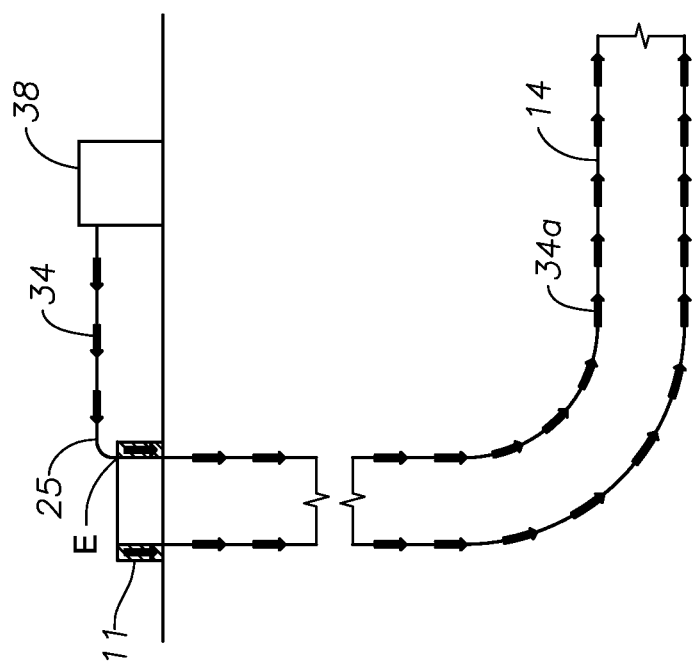

In FIG. 2a, the emitter electrode E of FIG. 1a is illustrated in more detail. Specifically, a transmitter 38 located at the surface 13 generates a current 34 on emitter electrode E that is connected to the first wellbore 10 via an insulated cable 25 that is directly clamped or connected to the wellhead 11, which is in direct electrical contact with the conductive member 14.

In FIG. 2b, the emitter electrode E of FIG. 2b is illustrated in more detail. Specifically, a transmitter 38 located at the surface 13 generates a current 34 that is delivered via an insulated cable 25 to an emitter electrode E that is deployed downhole in the first wellbore 10 and is electrically attached to conductive member 14, which may be in the vicinity of the area that is targeted for SAGD drilling. In some embodiments, cable 25 may be shielded to minimize interference with the magnetic field generated by the conductive member 14.

In the embodiments of both FIGS. 2a and 2b, currents 34a travelling on the conductive member 14 gradually leak into the proximate or adjacent formation 12 (see FIGS. 1a and 1b) and follow an exponential decay provided that they are far from the ends of the conductive member 14. It is known that such current excitation can reach distances as large as 10000 feet and beyond, which is desirable for the SAGD application of the invention. In order to minimize resistance of the load that is connected to the transmitter 38, contact may be designed to reduce contact resistance as much as possible. For example, in the case of downhole excitation from the wellhead (FIGS. 1a and 2a), a mechanical clamp may be used. In the case of downhole excitation from a point within the target wellbore, an elongated conductor may be positioned on the wellbore floor and urged against the wellbore, such as by gravity, to enhance contact with the formation.

Figure 3A:
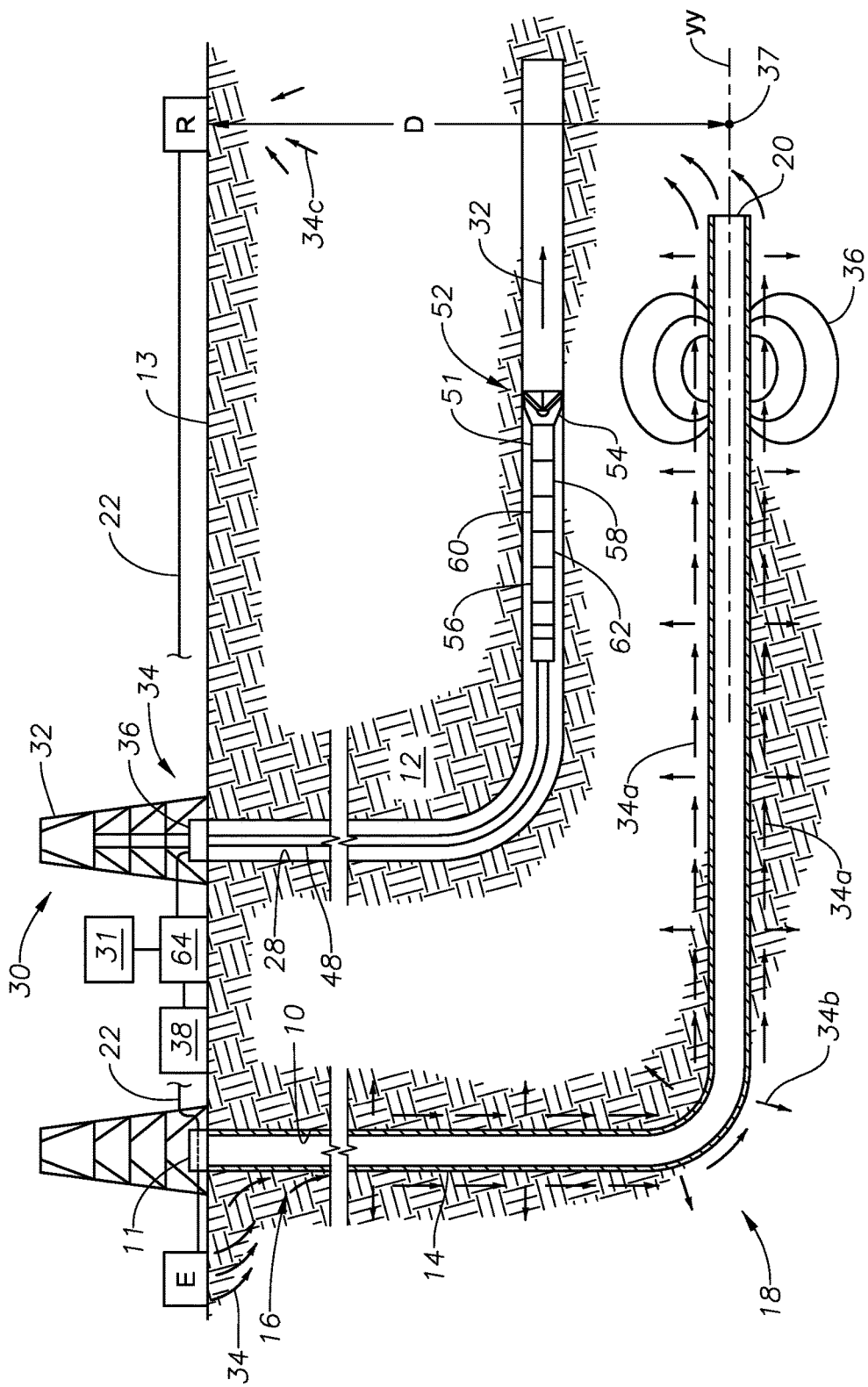
FIG. 3a illustrates an embodiment of the invention where a source emits a current into the formation proximate a target wellbore and the current returns to a ground spaced apart from the emitter.

FIG. 3a illustrates an embodiment similar to FIG. 1a, but where emitter electrode E is not in direct electrical contact with conductive member 14 or wellhead 11. Rather, emitter electrode E injects current via the emitter electrode E into the formation 12 proximate or adjacent the wellhead 11. Emitter electrode E is positioned close enough to the wellhead 11 that current will flow through the formation 12 to the target wellbore 10 and conductive member 12. Persons or ordinary skill in the art will appreciate that in this configuration, the return electrode R must be positioned a distance sufficiently far away from the emitter electrode E so that the current 34 will flow first to the conductive member 14 of first wellbore 10 and then to the return electrode R, as opposed flowing directly to the return electrode E.

As stated above, the placement or position of the return electrode R for the current injection system can be selected to optimize performance of the wellbore ranging system. In certain embodiments, as illustrated in certain of FIGS. 3 and 4, a reference axis YY can be selected and utilized to position the return electrode R. The reference axis YY may be selected to pass through the end 20 of the first wellbore 10, extending out into the formation 12, and around which the end portion of the wellbore is defined. A reference point 37 along the reference axis YY is selected and the position of the return electrode R is then selected to minimize the distance "D" between the reference point 37 and the return electrode R. In this case, optimization would include generating the strongest magnetic field possible from the conductive member 14 in the area being measured by the EM sensor 51 of the second wellbore 28.

Figure 3B:
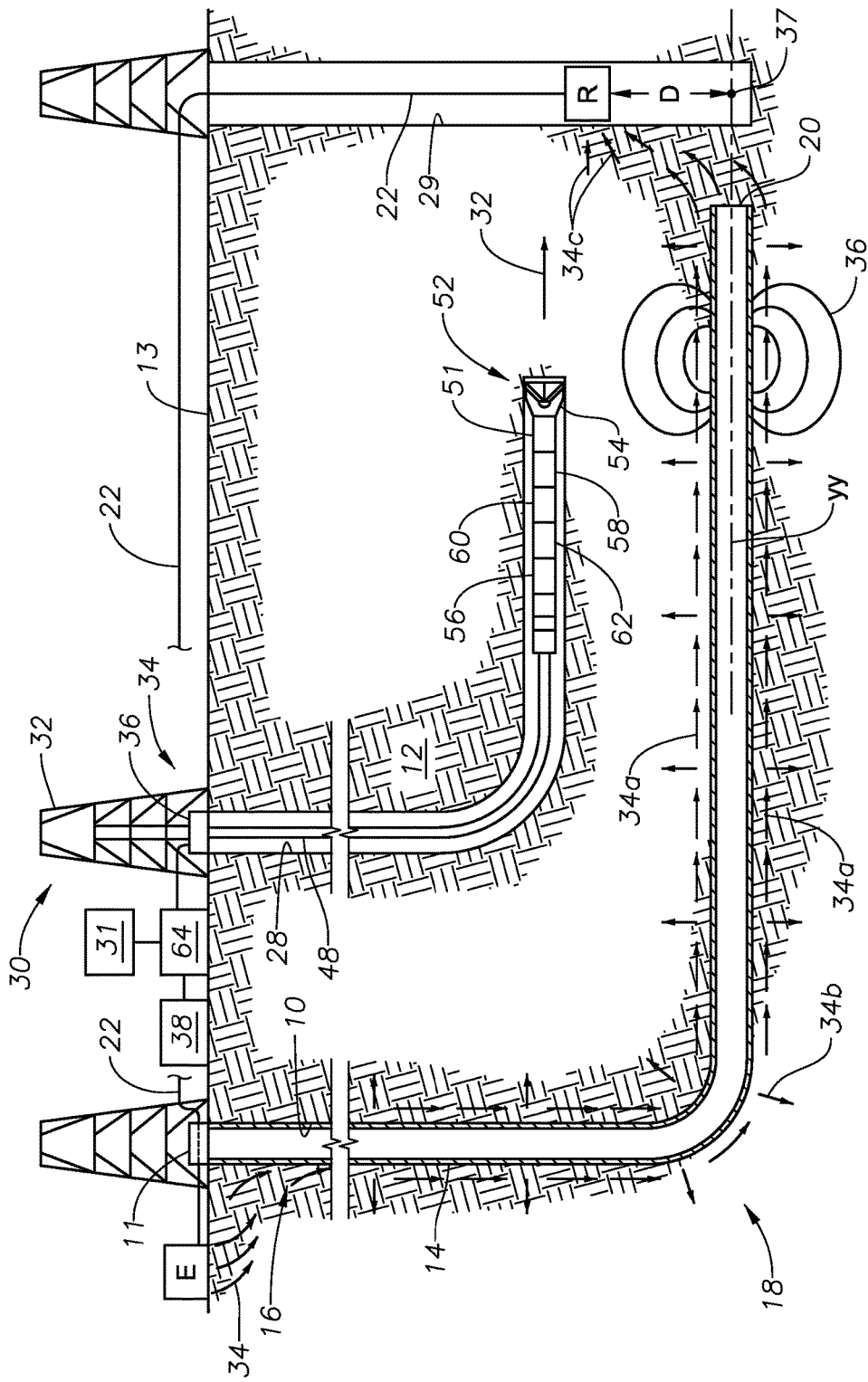
FIG. 3b illustrates an embodiment of the invention where a source delivers a current to a target wellbore and utilizes a grounded return in a separate wellbore spaced apart from the target and injector wellbores.

FIG. 3b illustrates an embodiment similar to FIG. 3a, but where return electrode R is not on the surface 13. Rather, return electrode R is positioned within formation 12. Specifically, return electrode R is lowered, on a wireline, slickline or other cable, down into a third wellbore 29 extending from surface 13 into formation 12. As shown, insulated conductive wire 22 joins return electrode R and emitter electrode E to complete an electrical circuit. Alternatively, the third wellbore 29 may include a pipe string, such as casing or a drill string (not shown) in contact with the formation 12, that is electrically connected to return electrode R positioned at the surface 13 of the third wellbore 29. In these embodiments, it will be appreciated that reference point 37, and hence return electrode R, need not be positioned as far away from the end 20 of first wellbore 10 as in earlier described embodiments because the conductive member 14 of first wellbore 10 is more directly positioned between the physical position of emitter electrode E and return electrode R such that the current 34 is more likely to travel along conductive member 14 directly to return electrode R as opposed directly traveling through the formation 12 between emitter electrode E and return electrode R.

FIG. 3c illustrates an embodiment similar to FIG. 3b, but where the return electrode R in the formation 12 is positioned within second wellbore 28. Specifically, return electrode R can be carried by the conveyance mechanism 48 that also carries EM sensor 51. Alternatively, return electrode R may be lowered within conveyance mechanism 48 into second wellbore 28 on a cable, such as a wireline. Other modules 56, 58, 60, 62 may also be carried by conveyance mechanism 48 as described above. The emitter electrode E may be attached directly to the first wellbore 10 (as described in FIG. 1a) or separated from the first wellbore 10 (as described in FIG. 3a). Insulated wire 22 extends between emitter electrode E and return electrode R to complete a circuit. In certain embodiments, the conveyance mechanism 48 includes one or more insulators or gap subs G deployed along conveyance mechanism 48 to insulate the return electrodes R from the EM sensor 51, and in particular, to inhibit current 34c from traveling along conveyance mechanism 48 from return electrode R to EM sensor 51. As used herein, "gap sub" means an insulator such as a gap in conductive portions of a pipe string or an insulating portion of a pipe or an insulator sub or any other non-conductive device deployed to inhibit current flow along the drill string.

Figure 4A:
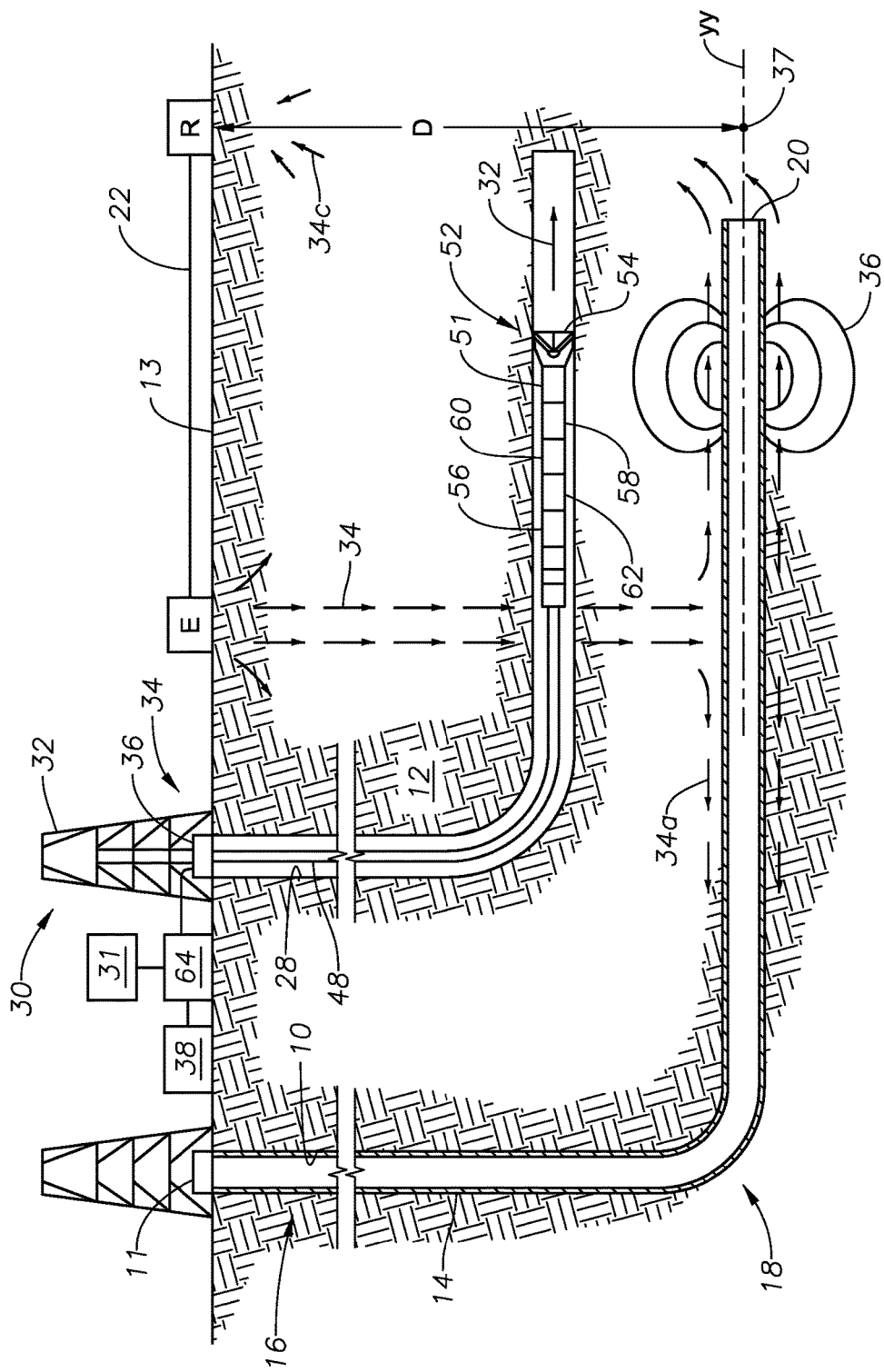
FIG. 4a illustrates an embodiment of the invention where a source, spaced apart from a target wellhead, emits a current into a shallow formation and the current returns to a ground spaced apart from the emitter.

Turning to FIG. 4a, an embodiment of a wellbore ranging system is illustrated where an emitter electrode E is positioned on the surface 13 of the formation 12 above the first wellbore 10, while the return electrode R is positioned on the surface of the formation 12 at a distance spaced apart from emitter electrode E. A reference axis YY can be selected and utilized to position the return electrode R. The reference axis YY may be selected to pass through the end 20 of the first wellbore 10, extending out into the formation 12, and around which the end portion of the wellbore is defined. A reference point 37 along the reference axis YY is selected and the position of the return electrode R is then selected to minimize the distance "D" between the reference point 37 and the return electrode R. In this case, optimization would include generating the strongest magnetic field possible from the conductive member 14 in the area being measured by the EM sensor 51 of the second wellbore 28. As such, current 34 injected into the ground by emitter electrode E will travel to first wellbore 10, then along conductive member 14 and finally, back through the formation to return electrode R. As shown, an insulated wire 22 extending between emitter electrode E and return electrode R completes the circuit. It will be appreciated that due to loss of current in the formation, this particular embodiment would be most desirable in ranging instances where the target wellbore 10 is positioned in the formation at a relatively shallow depth, such as for instance, at a depth of 30 feet or less, and in some embodiments, at a depth of less than 20 feet. In general, "spaced apart" means there is no uninterrupted electrical connection through an electric conductor such as copper or other metals.

Figure 4B:
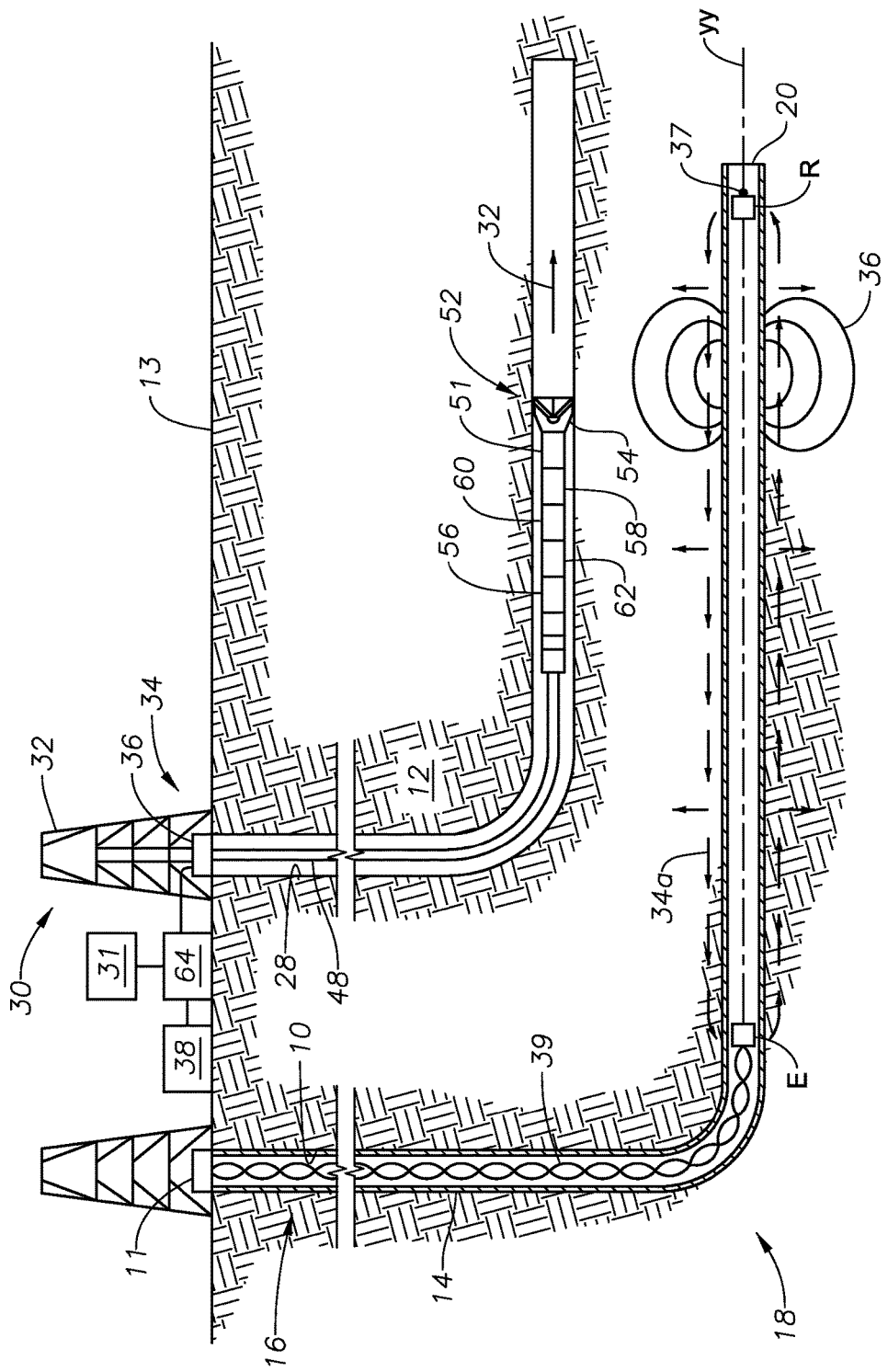
FIG. 4b illustrates an embodiment of the invention where a source is provided with an emitter positioned downhole on a twisted wire pair for delivery of a current to a target pipe string and a grounded return in positioned farther downhole in the target wellbore.

FIG. 4b illustrates a current injection system where the emitter electrode E and the return electrode R are both located downhole within first wellbore 10, but spaced apart from one another. Emitter electrode E is deployed on a twisted wire pair 39 for delivery of a current to conductive member 14. Return electrode R is grounded further downhole. In this case, the current travels axially along the target pipe string and a magnetic field is generated from the pipe string. Current 34 injected at emitter electrode E travels along conductive member 14, as illustrated by current lines 34a. While a portion of the current will leak into formation 12 as shown by current lines 34b, most of current 34a will travel along conductive member 14, thereby resulting in an electromagnetic field 36 emanating from conductive member 14.

Figure 4C:
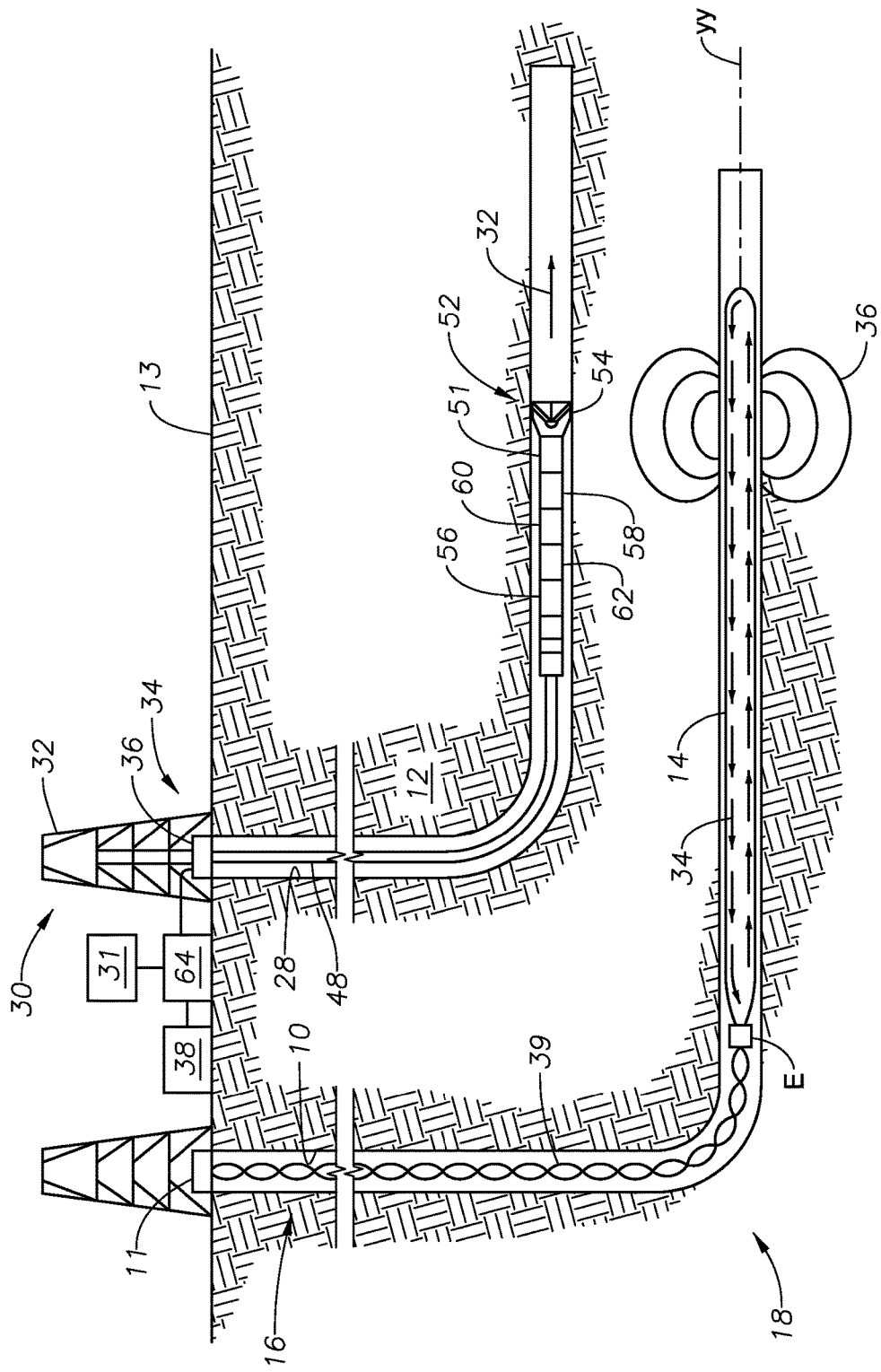
FIG. 4c illustrates an embodiment of the invention where a source is provided with an emitter positioned downhole on a twisted wire pair for delivery of a current to an elongated wire loop positioned within the target wellbore.

FIG. 4c illustrates a current injection system where an emitter electrode E is positioned downhole within first wellbore 10 on a twisted wire pair 39 for delivery of a current 34 to conductive member 14 disposed downhole from emitter electrode E within wellbore 10. In the particular embodiment, conductive member 14 is an elongated wire loop positioned within the target wellbore 10. In this case, the current travels axially along the wire loop and a magnetic field 36 is generated from the wire loop within the wellbore 10.

As stated above, the placement or position of the return electrode E for the current injection system can be selected to optimize performance of the system by driving an injected current along a conductive member or body within the target wellbore. In certain embodiments, a reference axis can be selected and utilized to position the return electrode R. The reference axis may be selected to pass through the end of the target wellbore, extending out into the formation. A reference point along the reference axis is selected and the position of the return electrode R, whether on the surface or in the formation, is then selected to minimize the distance "D" between the reference point and the return electrode R. In this case, optimization would include generating the strongest magnetic field possible in the target wellbore in the area being measured by the EM sensor of the investigative or second wellbore. In some embodiments, either the emitter electrode E or the return electrode R or both may be dynamically moved during the drilling process to maximize system response in a desired portion of the target wellbore. In this case, the reference point along the reference axis would likewise move so as to continue to minimize separation between the reference point and the return electrode R. Thus, the return electrode would be moved out away from the wellhead 11 of first wellbore 10 in the direction of the extending wellbore 10

Determination of the distance and direction of the conductive member relative to the second wellbore is based on the magnetic fields received by one or more EM sensors. An EM sensor may be a magnetometer disposed to measure an absolute magnetic field or a receiver may be a magnetic gradient sensor (or magnetic gradiometer) disposed to measure magnetic field gradients.

In any event, determination of distance and direction is achieved by utilizing the relationship below between the conductive member and the magnetic field received by the EM sensor(s).

$$\overline{H} = \frac{I}{2\pi r}\hat{\phi} \quad (1)$$

H is the magnetic field vector, I is the current on the conductive member, r is the shortest distance between the EM sensor(s) and the conductive member and φ is a vector that is perpendicular to both z axis of the EM sensor(s) and the shortest vector that connects the conductive member to the EM sensor(s). It should be noted that this simple relationship assumes constant conductive member current along the conductive member, however, persons of ordinary skill in the art will appreciate that the concept can be extended to any current distribution by using the appropriate model. It can be clearly seen that both distance and direction can be calculated by using this relationship.

$$r = \frac{I}{2\pi|\overline{H}|} \quad (2)$$

$$\Phi = \text{angle}(\hat{x}\cdot\overline{H}, \hat{y}\cdot\overline{H}) + 90 \quad (3)$$

where · is the vector inner-product operation. It has been observed by experience that Equation (3) is a reliable measurement of the relative direction of the conductive member with respect to EM sensor(s) coordinates and it can be used as long as signal received from the conductive member is substantially large compared to the measurement errors. However Equation (2) cannot be reliably used to calculate distance since a direct or accurate measurement of I does not exist. Specifically, it has been observed that any analytical calculation of I can be 50% off due to unknown conductive member characteristics. Furthermore, any in-situ calibration of I does not produce a system reliable enough to be used in the SAGD or wellbore intercept application due to variations in conductive member current due to changing formation resistivity and skin depth at different sections of a wellbore. As a result, the systems of the prior art that measure absolute magnetic field values are not suitable for SAGD or wellbore intercept applications.

To overcome these problems of the prior art, magnetic field gradient measurements are utilized, where spatial change in the magnetic field is measured in a direction that has a substantial component in the radial (r-axis) direction as below:

$$\frac{\partial \overline{H}}{\partial r} = -\frac{I}{2\pi r^2}\hat{\phi} \quad (4)$$

where ∂ is the partial derivative. With this gradient measurement available in addition to an absolute measurement, it is possible to calculate the distance as follows:

$$r = \frac{|\overline{H}|}{\left|\frac{\partial \overline{H}}{\partial r}\right|} \quad (5)$$

As such, Equation (5) does not require knowledge of the conductive member current I, if both absolute and gradient measurements are available. The direction measurement can still be made as shown in Equation (3).

In practical implementation it is not feasible to measure all components of the magnetic field which are required for making use of all of the above formulas. Instead, a single component of the magnetic field that is oriented in direction u can be used. The magnetic field for such component can be written as:

$$\overline{H}\cdot\hat{u} = \frac{I}{2\pi r}\left(\hat{u}\cdot\hat{\phi}\right) \quad (6)$$

where hat sign indicates unit vectors and bar indicates vectors. Similarly, the u-component magnetic field gradient along v direction can be written as:

$$\frac{\partial \overline{H}\cdot\hat{u}}{\partial v} = \frac{\partial \frac{I}{2\pi r}\hat{\phi}\cdot\hat{u}}{\partial v} \quad (7)$$

-continued $$= \frac{I}{2\pi} \frac{\partial \frac{1}{r}\hat{\phi} \cdot \hat{u}}{\partial v}$$

$$= \frac{I}{2\pi} \frac{\partial \frac{1}{r}\hat{\phi}}{\partial v} \cdot \hat{u}$$

$$= \frac{I}{2\pi} \left( \frac{\partial \frac{1}{r}}{\partial v} \hat{\phi} + \frac{1}{r} \frac{\partial \hat{\phi}}{\partial v} \right) \cdot \hat{u}$$

$$= \frac{I}{2\pi} \left( -(\hat{v} \cdot \hat{r}) \frac{1}{r^2} \hat{\phi} - \frac{1}{r} (\hat{v} \cdot \hat{\phi}) \frac{\hat{r}}{r} \right) \cdot \hat{u}$$

$$= -\frac{I}{2\pi r^2} ((\hat{v} \cdot \hat{\phi})(\hat{u} \cdot \hat{r}) + (\hat{v} \cdot \hat{r})(u \cdot \phi))$$

With these absolute and gradient measurements available, distance to conductive member can be written as:

$$\frac{\overline{H} \cdot \hat{u}}{\frac{\partial \overline{H} \cdot \hat{u}}{\partial v}} = -r \frac{(\hat{u} \cdot \hat{\phi})}{((\hat{v} \cdot \hat{\phi})(\hat{u} \cdot \hat{r}) + (\hat{v} \cdot \hat{r})(\hat{u} \cdot \hat{\phi}))} \quad (8)$$

where $$\hat{r} = \hat{x} \cos(\Phi) + \hat{y} \sin(\Phi)$$

$$\hat{\phi} = -\hat{x} \sin(\Phi) + \hat{y} \cos(\Phi) \quad (9)$$

In an example case, where $H_y$ component is measured along x, Equation (7-9) can be combined as following:

$$\frac{H_y}{\frac{\partial H_y}{\partial x}} = r \frac{\cos(\Phi)}{(\sin(\Phi)^2 - \cos(\Phi)^2)} \quad (10)$$

Finally distance can be written as:

$$r = \frac{H_y}{\frac{\partial H_y}{\partial x}} \frac{(\sin(\Phi)^2 - \cos(\Phi)^2)}{\cos(\Phi)} \quad (11)$$

The gradient field in Equation (11) is realized in practice by utilizing finite difference of two magnetic field dipole measurements as shown below:

$$r = \frac{H_y}{\frac{H_y\left(x + \frac{\Delta x}{2}, y\right) - H_y\left(x - \frac{\Delta x}{2}, y\right)}{\Delta x}} \frac{(\sin(\Phi)^2 - \cos(\Phi)^2)}{\cos(\Phi)} \quad (12)$$

Figure 5:
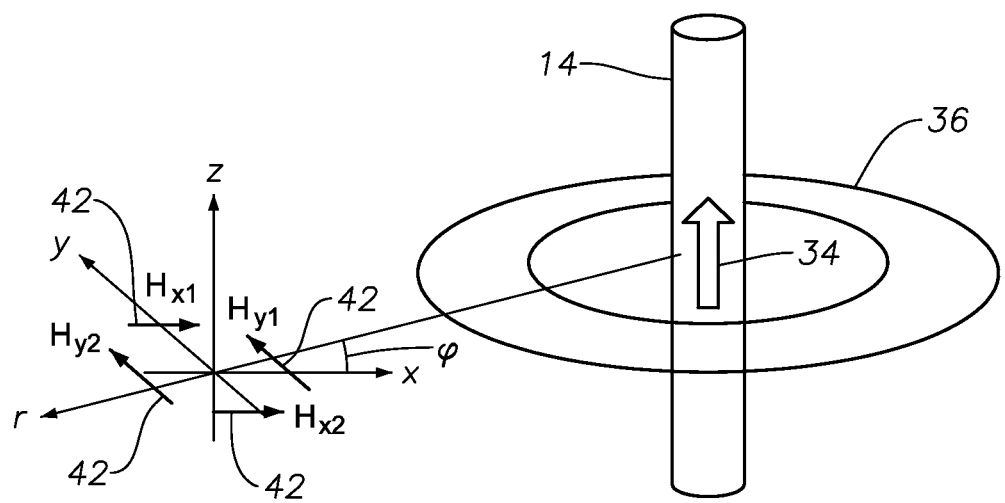
FIG. 5 illustrates the magnetic gradient-based measurement principle of a gradient-based wellbore ranging system.

Utilizing these principles, FIG. 5 illustrates of one possible EM sensor 51 that could be utilized in certain embodiments. Specifically illustrated is a magnetic field gradient sensor 51 configuration having 4-dipoles ($H_{x1}$, $H_{x2}$, $H_{y1}$, $H_{y2}$) arranged about a primary axis Z and shown in relation to a conductive member 14 and the magnetic fields 36 produced by the currents 34 on the conductive member. The dipoles $H_{x1}$, $H_{x2}$, $H_{y1}$, $H_{y2}$ as shown are arranged at 90° from one another about a primary axis Z. As used herein, dipole means an antenna or electrode formed of elongated coil of wire disposed along a dipole axis and having a multiplicity of turns of wire about a core as is well known in the art. The arrows 42 generally indicate the direction of the core and windings of each dipole.

Persons of ordinary skill in art will understand, however, that as can be seen from Equation (10), gradient measurement with a single component becomes unstable due to singularity of the denominator every 90° starting from 45°. As a result, gradient measurement with a single component is only sensitive to angles 90°×k, where k is an integer. This would apply to FIG. 5 as well, where 4 dipoles arranged at 90° from one another are used to calculate the magnetic fields.

In embodiments that measure both absolute magnetic fields and gradient magnetic fields, it should be noted that the EM sensor, in some embodiments, has a minimum of 3 dipoles H for achieving gradient measurement, namely 2 dipoles for gradient plus 1 dipole for absolute electromagnetic field magnitude measurement. An example would be three dipoles H arranged in a triangle in the EM sensor about a primary axis Z to eliminate blind spots as discussed below. However, because symmetric dipole arrangements are easier to engineer and manufacture, such a three dipole arrangement may be less desirable than symmetric dipole arrangement in some cases.

Figure 6A:
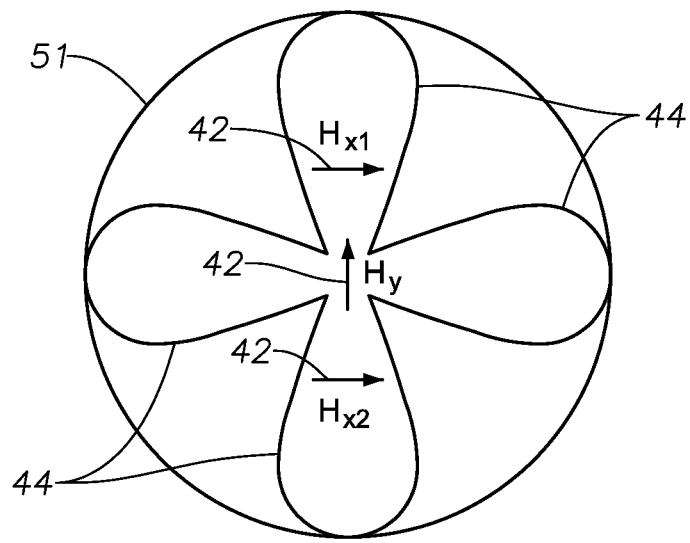
FIG. 6 illustrates 3-, 4- and 8-dipole arrangements for a gradient-based wellbore ranging system.
Figure 6B:
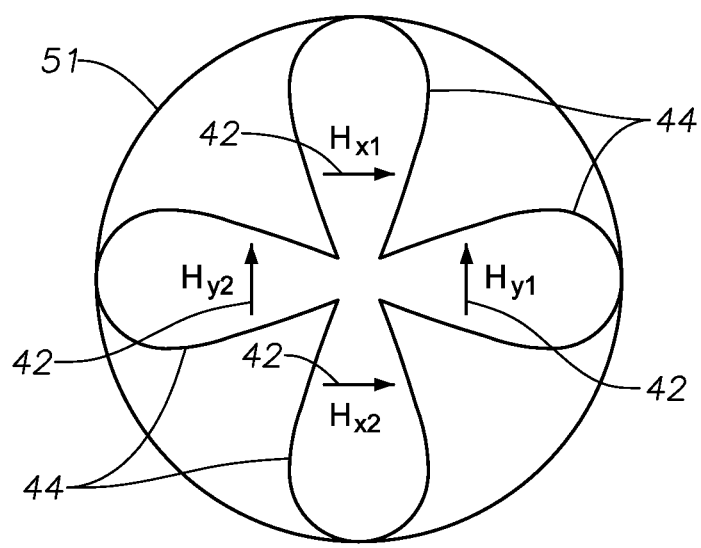
Figure 6C:
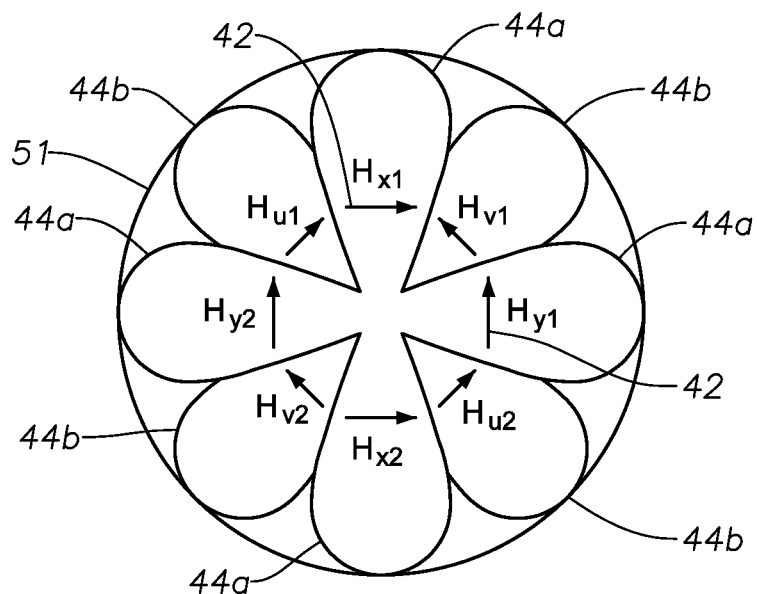

FIG. 6a illustrates a 3-dipole EM sensor having dipoles $H_{x1}$, $H_{x2}$, and $H_y$. The arrows 42 generally indicate the direction of the core and windings of each dipole. FIG. 6b illustrates a 4-dipole EM sensor having dipoles $H_{x1}$, $H_{x2}$, $H_{y1}$, $H_{y2}$. FIG. 6c illustrates an 8-dipole EM sensor having dipoles $H_{x1}$, $H_{x2}$, $H_{y1}$, $H_{y2}$, $H_{u1}$, $H_{u2}$, $H_{v1}$, $H_{v2}$ that could be utilized in certain embodiments. With respect to each of FIGS. 6a, 6b and 6c, the directionality of sensitivity of the measurement is indicated in each case by lobes 44. As can be seen, 3- and 4-dipole devices can make good measurement of gradient field only in directions that are in the vicinity of 0°, 90°, 180° and 270°, resulting in blind spots in the magnetic gradient field data. One solution to this problem is to use dipoles and gradient measurements in more directions, as shown in FIG. 6c. In this case, four of the dipoles cover 0°, 90°, 180° and 270° as illustrated by lobes 44a, while the other 4 dipoles cover 45°, 135°, 225° and 315° as illustrated by lobes 44b. It should be noted that coverage similar to the configuration shown in FIG. 6c could be achieved with a total of 6 dipoles H without significantly impacting accuracy; however additional information provided by the extra dipoles H can be used for different purposes such as quality control and having engineering advantages of a symmetric sensor array.

Figure 6D:
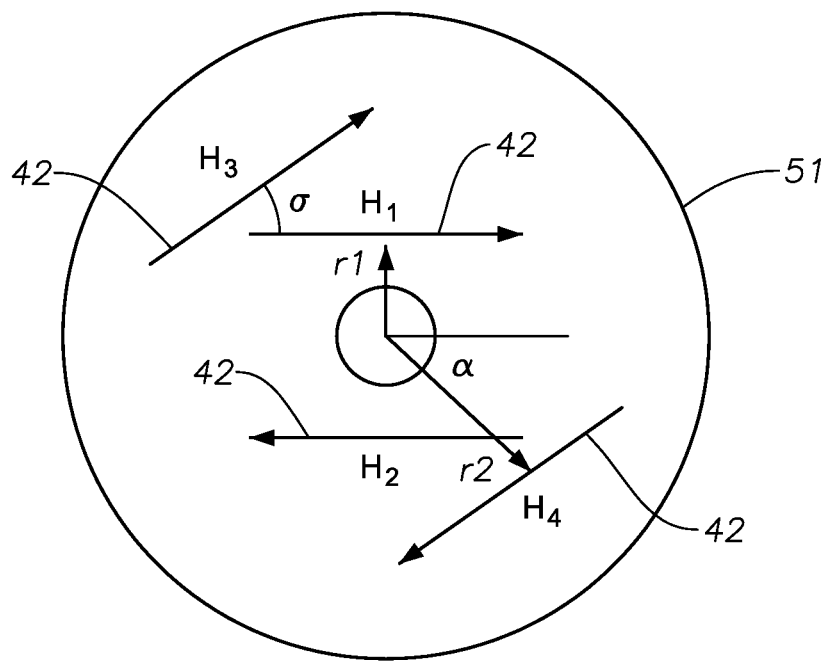

In another embodiment of an EM sensor, shown in FIG. 6d, two pairs of dipoles ($H_1$, $H_2$ and $H_3$, $H_4$) are spaced apart and arranged so as to be at an angle to one another. The radial angle α around a central axis and/or the relative angle σ between pairs of dipoles may be adjusted between 0-89°, and in some embodiments, approximately 45°, to minimize or eliminate blind spot area, depending on the size and properties of the particular dipoles. The pairs of dipoles ($H_1$, $H_2$ and $H_3$, $H_4$) may also be positioned at different radii, r1 and r2 about the axis. For example, each dipole coil may be about 0.1 meters long and have approximately 100,000 turns of wire. Each coil may be connected to circuitry which includes a low noise, high gain, band pass amplifier. The amplifier voltages are fed individually into a downhole microprocessor for analysis. Persons of ordinary skill in the art will appreciate that because of the expense of the sensors, as well as the limited space downhole for any unnecessary components, elimination of any number of dipoles while minimizing blind spots is desirable.

EM sensor magnetic dipoles can be realized with magnetometers, atomic magnetometers, flux-gate magnetometers, magnetic gradiometers, solenoids or coils. It should be noted here that gradient measurement can also be conducted by electrically connecting two magnetic dipoles in different orientations and making a single measurement, as opposed to subtracting values of two separate magnetic field measurements. The processing methodologies described above can be generalized to such case.

Finally, some systems that measure absolute magnetic field, in order to obtain the best results, it is necessary to position a magnetometer proximate or adjacent a drill bit. While some embodiments disclosed herein illustrated the EM sensor as being disposed downhole proximate or adjacent a drill bit, use of magnetic gradient as opposed to absolute magnetic field in certain embodiments minimizes the effects of the location of the EM sensor along the drill string. Thus, by utilizing magnetic gradient in the practice of certain embodiments, it is possible to position the EM sensor spaced apart from the drill bit.

As stated above, the absolute magnetic field magnitude measurement utilized in the prior art is undesirable because the accuracy of such measurements can be affected by many different variables, such as skin effect, condition of conductive member, i.e., usually, the first wellbore casing, profile of conductive member, etc. For example, relevant characteristics of the first wellbore casing such as conductivity and magnetic permeability are known to show large variations between different casing sections, and also can change in time due to effects such as mechanical stress, temperature and corrosion. Since distribution of current on the first wellbore casing depends on the skin depth and hence resistance per pipe length, it is not possible to make an accurate analytical estimation about the current excited on the first wellbore casing due to the source. Furthermore, variations along different casing sections also make it very difficult to calibrate current in one section of the casing based on another section.

Figure 7:
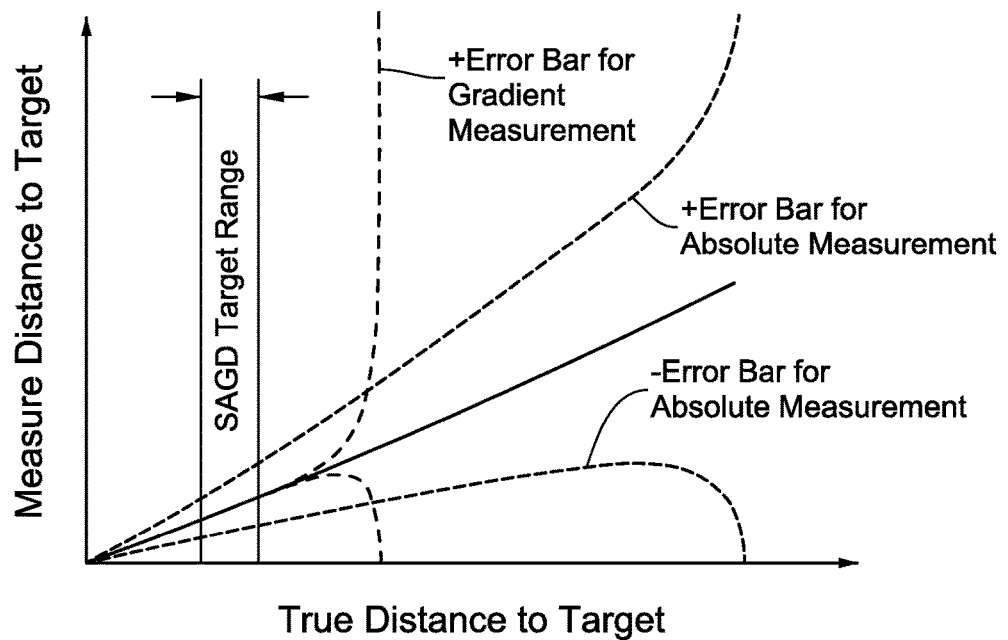
FIG. 7 is a graph illustrating the uncertainty in absolute measurement vs. gradient measurement of magnetic fields.

As illustrated in FIG. 7, it has been observed that distance from absolute measurement magnitude can detect presence of the first wellbore or "target" from farther away, however it has a very large cone of uncertainty associated with it. Gradient measurement, on the other hand, can detect the target at shorter distances; however, it has a much smaller cone of uncertainty. The requirements for use of the ranging methods disclosed herein for SAGD and wellbore intercept applications fall inside the gradient measurement capability range and as a result, the methods and systems disclosed herein have a clear advantage when compared to prior art systems and methods based on absolute measurement.

Figure 8:
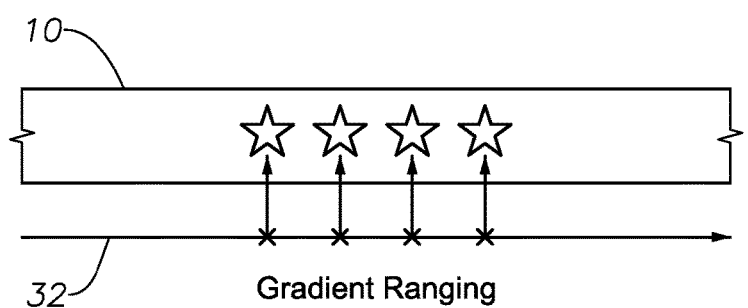
FIG. 8 illustrates a method to measure distance using a gradient-based wellbore ranging system.

With reference to FIG. 8, in some ranging and directional drilling methods, it is known to use multiple absolute direction measurements from the wellbore being drilled at different angles to the target wellbore through triangulation techniques to determine a range. This requires the trajectory of the wellbore being drilled to be a spiral, S-shape, or curving relative to the target wellbore, a trajectory that would be undesirable for SAGD applications. Furthermore, such a triangulation approach averages information over long distances and reduces the geosteering response time. In contrast, as illustrated in FIG. 8, use of the gradient ranging methods as disclosed herein permits the trajectory of the second wellbore to be substantially parallel to the target wellbore, in a linear path, which can be more desirable for SAGD operations. Furthermore since independent information can be available at each point, geosteering can respond to deviations in distances more quickly than the some other methods.

Moreover, as described above, in order to maximize steering performance, especially when driven in a spiral or S-shaped path, magnetometers are at times positioned in the drill string as close as possible to the drill bit, and in some embodiments, proximate or adjacent to the drill bit. In the embodiments disclosed herein, as used for SAGD applications, the drill string is substantially parallel to the target wellbore, so placement of the EM sensor(s) is less important in terms of steering performance. It is also possible to place the EM sensor(s) elsewhere on the drill string, such as in the bit.

Figure 9:
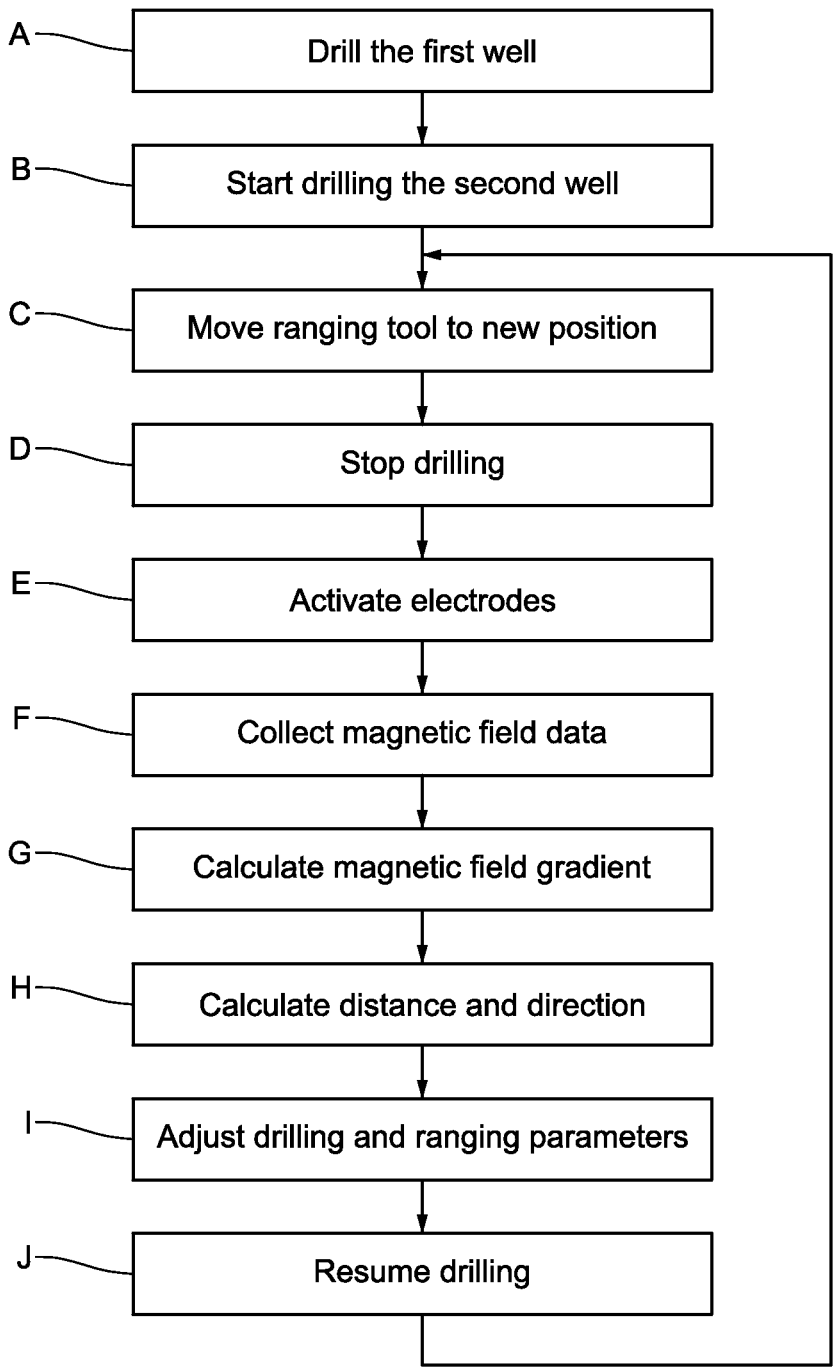
FIG. 9 is a flow chart of a ranging method of a gradient-based wellbore ranging system utilizing magnetic field gradient.

FIG. 9 illustrates the steps of implementation of some embodiments of a magnetic gradient ranging system as disclosed herein to range between first and second wellbores. In step A, a first wellbore is drilled. Once drilled, a conductive member is positioned in a portion of the first wellbore, namely the portion from which it is desired to range from the second wellbore. The conductive member may be wellbore casing or some other conductive member. The first wellbore can be either the injector or producer wellbore to the extent the ranging is utilized in SAGD operations. Traditionally the producer wellbore is drilled first since it has to be placed in the reservoir at the optimum position to yield maximum amount of hydrocarbons. However, for purposes of the ranging method as disclosed herein, either wellbore could be drilled first. In wellbore intercept operations, the first wellbore may be the wellbore that is to be intercepted, i.e. "killed". In certain embodiments of this step, a wellbore placement tool such as azimuthal propagation resistivity tools or an ultra-deep reading resistivity tool may be used to place the first wellbore. Such tools are commonly used to position a producer wellbore at optimal distances from the adjacent layers in the reservoir. Moreover, survey data can be collected in the drilling of this first wellbore to aid the guiding of the second wellbore.

In step B, drilling of the second wellbore is started. In some embodiments, the build section, i.e., the section of the second wellbore that is to be placed relative to the first wellbore, is guided either with survey information or absolute or gradient information from the ranging tool described in the following steps.

After the build section has begun, a ranging procedure to keep the second wellbore at a desired trajectory relative to the first wellbore is initiated. For SAGD operations, the trajectory would be parallel and at desired distance to the first wellbore. The ranging procedure utilizes a ranging system having one or more emitter electrodes E, one or more return electrodes R and an EM sensor as described above. The emitter electrode E is deployed at any number of locations removed from the second wellbore, such as for example, at the surface proximate or adjacent the first wellbore. More specifically, in some embodiments, the emitter electrode E is positioned at the surface, either attached to the first wellbore in direct electrical contact or in contact with the ground proximate or adjacent the first wellbore or at another location along the surface. Alternatively, in other embodiments, the emitter electrode E may be placed at a location within the first wellbore. The return electrode R is deployed at a location remote from the emitter electrode. Thus, in some embodiments, the return electrode R may be deployed in the second wellbore, and in some embodiments, as part of the drill string being utilized to drill the second wellbore. Alternatively, in other embodiments, the return electrode R may be placed on the surface, in a location to maximize response of the ranging system. In this regard, a reference axis may be defined. The reference axis is an elongated axis extending coaxially along a distal portion of the first wellbore and out into the formation beyond the end of the first wellbore. A reference point is selected along the reference axis, after which, the return electrode is positioned on the surface at a location so as to minimize the distance between the reference point and the return electrode. In some embodiments, the reference point may be selected to be at the end of the first wellbore. In some embodiments, the reference point may be selected to be at a point beyond the end of the first wellbore. Alternatively, the return electrode may be positioned in the second wellbore so as to minimize this distance. As the drilling of the second wellbore progresses, the reference point, and hence the return electrode, can be relocated to maximize system ranging response as an additional portion of the second wellbore is drilled.

In certain embodiments, a second reference point on the reference axis may be selected and utilized to place the emitter electrode E.

Once the ranging system, i.e. the emitter electrode E, the return electrode R, the EM sensor(s), is in position as at step C, a wellbore ranging method is employed. In certain embodiments, the method may include the use of magnetic gradients as described above. It should be noted here that the disclosed system can be utilized to maintain substantially the same distance between the first and second wellbores, or drilling orientation of the second wellbore can follow a prescribed or controlled varying distance based on local characteristics of the formations, such as in the case of wellbore intercept procedures.

In some embodiments, as at step D, drilling is interrupted or temporarily suspended during wellbore ranging in order to minimize noise levels that could interfere with ranging measurements. The time between the drilling stop and ranging start can be optimized to reduce noise due to wobbling and also minimize idle time. Similarly, duration of ranging can be optimized to reject electrical system and magnetic environment noise and also minimize idle time.

In step E, electrodes of the ranging system are activated to inject current in order to generate a magnetic field from the first wellbore, namely the wellbore containing the conductive member. Current injection can be either automatic, after a predetermined distance along the second wellbore trajectory has been drilled, a predetermined time period has lapsed or base on some other criteria, or current injection can be manual.

With an electromagnetic field emanating from the first wellbore, the EM sensor is activated. The EM sensor may be activated manually from the surface or automatically. For example, in some embodiments, a controller module carried by the BHA in the second wellbore may include an algorithm that detects currents and activates the EM sensor(s). Specifically, in step F, although the EM sensor(s) may be any number of devices suitable for measuring magnetic fields, in some embodiments, the EM sensor comprises a set of magnetic dipole antennas that detect electromagnetic field signals generated therein which electromagnetic field signals arise from the currents driven to travel along a length of the first wellbore. The electromagnetic field signals may be recorded and processed locally or may be transmitted to the surface for recording and/or processing. In some embodiments, as illustrated in FIG. 6, at least two magnetic field signals representing at least two different locations of magnetic fields are recorded. This may be accomplished utilizing multiple dipole antennas spaced apart from one another. The data that is collected by the dipole antennas may be in the form of magnetic field, electric field, voltage or current. In order to perform signal to noise analysis, it is advantageous to analyze the data in magnetic field units.

In step G, the magnetic field data collected in step F is used to calculate a range. In some embodiments, the range may be based on magnetic field gradient. For example, the magnetic field gradient may be calculated as described in Equations (1)-(12) above.

In step H, the distance and direction between the first and second wellbores is determined. Since the direction and distance results are based on the EM sensor's coordinate system, the EM sensor's coordinate system must be transformed in order to convert it to earth or other coordinate system that can be used in geosteering. Earth's magnetic field or gravity information may be used to measure receiver orientation and achieve the transformation described above.

In step I, the computed distance and direction are used to adjust the drilling parameters for the second wellbore, such as the trajectory of the wellbore path, after which, in step J, a geo steering system carried by the drill string may be accordingly adjusted in order to steer the drill bit based on the magnetic ranging and drilling resumes. The ranging procedure described in steps C-J may be performed at select depth intervals that optimize both geosteering performance and rig time. A priori information can be used to adjust the time interval between successive rangings. For example, if the survey data of the first wellbore indicates that the wellbore is expected to be substantially horizontal, the interval between ranging measurements can be extended. If the wellbore is expected to have dog-legs, ranging measurements can be performed more frequently. Near the end of a wellbore, currents travelling along a conductive member disposed therein behave differently compared to other sections of the conductive member since the flow path of current is modified. In order to avoid adverse effects, in some embodiments, the first wellbore can be drilled longer than the second wellbore. Based on the scenario, it is possible to switch to different processing techniques. As an example, if the second wellbore needs to locally follow a path that is far from the first wellbore, ranging based on the absolute value can be used locally.

Figure 10:
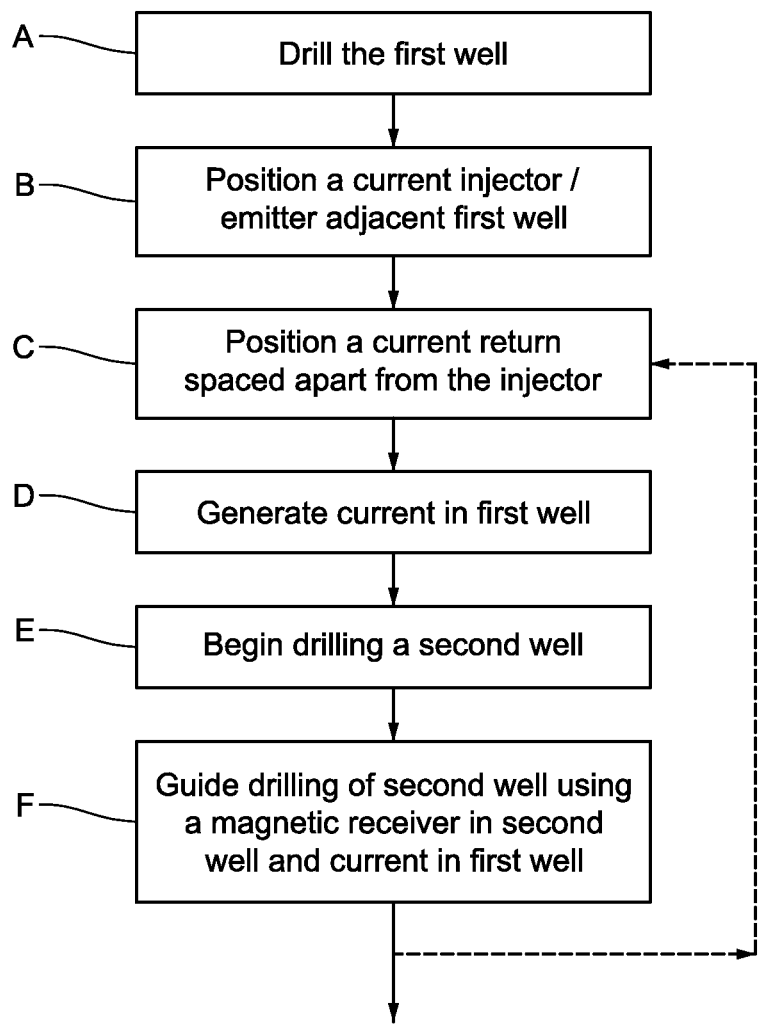
FIG. 10 is a flow chart of a ranging method for wellbores utilizing optimized placement of emitter and return electrodes to enhance system performance.

FIG. 10 illustrates the steps of implementation of some embodiments of a magnetic gradient ranging system as disclosed herein. In step A, a first wellbore is drilled. Once drilled, a conductive member is positioned in a portion of the first wellbore, namely the portion from which it is desired to range from the second wellbore. The conductive member may be wellbore casing or some other conductive member. The first wellbore can be either the injector or producer wellbore to the extent the ranging is utilized in SAGD operations. Traditionally the producer wellbore is drilled first since it has to be placed in the reservoir at the optimum position to yield maximum amount of hydrocarbons. However, for purposes of the ranging method as disclosed herein, either wellbore could be drilled first. In wellbore intercept operations, the first wellbore may be the wellbore that is to be killed. In certain embodiments of this step, a wellbore placement tool such as azimuthal propagation resistivity tools or an ultra-deep reading resistivity tool may be used to place the first wellbore. Such tools are commonly used to position a producer wellbore at optimal distances from the adjacent layers in the reservoir. Moreover, survey data can be collected in the drilling of this first wellbore to aid the guiding of the second wellbore.

In step B, an emitter electrode of a ranging system is positioned proximate or adjacent a first wellbore. The first wellbore include a conductive member. The emitter electrode may be indirect electrical contact with the conductive member. Alternatively, the emitter electrode may be in contact with the formation in which the first wellbore is located, so that the emitter electrode is in close proximity to the wellbore. In some embodiments, the conductive member is a wellbore casing and the emitter electrode is in contact with the wellhead from which the casing extends.

In step C, a return electrode is positioned. The location of the return electrode is selected in order to drive a current injected by the emitter electrode to the conductive member. Thus, the return electrode may be spaced apart from the emitter electrode. In some embodiments, the return electrode may be in contact with the formation a distance removed from the first wellbore and the emitter electrode. In some embodiments, the return electrode may be positioned so that the first wellbore is between the return electrode and the emitter electrode. In such case, the return electrode may be positioned on the surface of the formation or otherwise, disposed within the formation, such as in another wellbore. In some embodiments, the return electrode is positioned within the second wellbore from which EM measurements are taken. In such case, the return electrode may be carried by a drill string, wireline or other mechanism disposed in the second wellbore. In some embodiments, a third wellbore may be drilled and the return electrode positioned within the third wellbore. In such embodiments, preferably the third wellbore is drilled to be adjacent or proximate the distal end of the first wellbore or beyond the distal end of the first wellbore.

In step D, with the emitter electrode and the return electrode positioned as desired, a current is generated. The current may be generated as described above in the various embodiments of the system. The current is driven to the first wellbore, and in particular, the conducive member, and transmitted along at least a portion of the conductive member. The current is injected by the emitter electrode and travels to the return electrode after being transmitted along a portion of the conductive member. The current transmitted along a portion of the conductive member thereby generates an electromagnetic field that emanates from the first wellbore.

In step E, a second wellbore is drilled.

In step F, the drilling of the second wellbore, and in particular, the trajectory of the path of the second wellbore, is guided based on magnetic gradient measurements made using an EM sensor disposed in the second wellbore. Steps C-F may be repeated as drilling of the second wellbore progresses.

Thus, a wellbore ranging system has been described. Embodiments of the wellbore ranging system may generally include a first wellbore having a first end proximate a wellhead at the surface of a formation and a second, distal end disposed along a portion of a reference axis coaxially extensive with at least a portion of the first wellbore, the reference axis having a reference point thereon, wherein an elongated conductive member is disposed within at least a portion of the first wellbore; a current injection system comprising a source of alternating current at the surface, an emitter electrode, and a return electrode, wherein the emitter electrode is adjacent the wellhead and the return electrode is placed on the surface at a location that substantially minimizes the distance between the return electrode and the reference point; a second wellbore extending from the surface; and an EM sensor disposed within the second wellbore. In other embodiments, a wellbore ranging system may generally include a first wellbore having a first end proximate a wellhead at the surface of a formation and a second, distal end disposed along a portion of a reference axis coaxially extensive with at least a portion of the first wellbore, the reference axis having a reference point thereon, wherein an elongated conductive member is disposed within a portion of the first wellbore; a current injection system comprising a source of alternating current at the surface, an emitter electrode, and a return electrode, wherein the emitter electrode is spaced apart from the wellhead and the return electrode is positioned at a location remote from the emitter electrode; a second wellbore extending from the surface; and an EM sensor disposed within the second wellbore. For any of the foregoing embodiments, the system may include any one of the following elements, alone or in combination with each other:

A reference point is at the distal end of the first wellbore.
A reference point is at a location on the reference axis beyond the distal end of the first wellbore.
A pipe string carrying a drill bit disposed within the second wellbore, with the EM sensor carried by the pipe string.
Both the emitter and return electrodes are positioned on the surface.
Both the emitter and return electrodes are placed in the first wellbore.
The EM sensor comprises a gradiometer.
The EM sensor is a magnetic field gradient sensor comprising three dipoles.
A reference point is at the distal end of the wellbore, the emitter electrode is adjacent the wellhead of the first wellbore and the return electrode is on the surface substantially above the reference point.
The conductive member is a pipe string or wire loop.
The conductive member is casing.
The emitter electrode is located at the surface and is in direct electrical contact with the elongated conductive member at a location in the wellbore or on the wellhead.
The current injection system comprises an insulated cable that is deployed in the elongated wellbore and electrically attached to the emitter electrode.
The current injection system comprises an insulated cable that is shielded.
The emitter electrode is located at the surface in direct electrical contact with the formation adjacent the wellhead.
The return electrode is disposed at the surface above the distal end of the first wellbore.
A reference point is on the reference axis at a location beyond the distal end of the wellbore and the return electrode is disposed on the surface substantially above the reference point.
The return electrode is disposed in the second wellbore.
The return electrode is carried by the drill string in the second wellbore.
A drill string comprises an insulator between the return electrode and the EM sensor.
A first reference point is on the reference axis at a location beyond the distal end of the wellbore, a second reference point is on the reference axis at a location within the first wellbore, the emitter electrode is placed at the surface at a location that substantially minimizes the distance between the emitter electrode and the second reference point, and wherein the return electrode is disposed on the surface substantially above the first reference point.

The emitter electrode is disposed in the first wellbore on a twisted wire pair with the return electrode wire and in electrical contact with the elongated conductive member, and wherein the return electrode is disposed farther downhole along the reference axis and spaced apart from the emitter electrode.

The emitter electrode is disposed in the first wellbore on a twisted wire pair with the return electrode wire and in electrical contact with an elongated wire loop disposed within the first wellbore along a portion of the reference axis.

The current injection system comprises multiple excitation frequencies.

The EM sensor comprises a magnetometer.

The EM sensor comprises a magnetic gradient sensor.

The EM sensor comprises a magnetic field gradient sensor comprising 4 dipoles.

The EM sensor comprises a magnetic field gradient sensor comprising 6 dipoles.

The EM sensor comprises a magnetic field gradient sensor comprising 8 dipoles.

The EM sensor comprises atomic magnetometers, fluxgate magnetometers, solenoids or coils.

Thus, a wellbore ranging method has been described. Embodiments of the wellbore ranging method may generally include drilling a first wellbore having a first end proximate a wellhead at the surface of a formation and a second, distal end disposed along a portion of a reference axis coaxially extensive with at least a portion of the first wellbore; positioning an elongated conductive member within at least a portion of the first wellbore; commencing the drilling of a second wellbore extending from the surface; positioning a return electrode on the surface at a location so that at least a portion of the first wellbore is between the wellhead and the location of the return electrode; positioning an emitter electrode at a location remote from the return electrode; delivering an alternating current to the emitter electrode; generating a magnetic field from the first wellbore utilizing the emitter electrode; and measuring the magnetic field from the second wellbore. In other embodiments, a wellbore ranging system may generally include drilling a first wellbore having a first end proximate a wellhead at the surface of a formation and a second, distal end disposed along a portion of a reference axis coaxially extensive with at least a portion of the first wellbore; positioning an elongated conductive member within a portion of the first wellbore; commencing the drilling of a second wellbore extending from the surface; positioning a return electrode at a location in the formation below the surface; positioning an emitter electrode at a location remote from the return electrode; delivering an alternating current to the emitter electrode; generating a magnetic field from the first wellbore utilizing the emitter electrode; and measuring the magnetic field from the second wellbore. Likewise, a method for performing steam assisted gravity drainage to recover hydrocarbons from a formation has been described. The method of performing steam assisted gravity drainage may generally include drilling a first wellbore having a wellhead at the surface of a formation and positioning an elongated conductive member within a portion of the first wellbore, the wellbore characterized by a proximal end adjacent the wellhead and a distal end wherein the distal end of the wellbore extends along a portion of a reference axis coaxially extensive with at least a portion of the first wellbore; commencing the drilling of a second wellbore extending from the surface; positioning a return electrode on the surface at a location so that at least a portion of the first wellbore is between the wellhead and the location of the return electrode; positioning an emitter electrode at a location remote from the return electrode; activating an alternating current and delivering the alternating current to the emitter electrode; utilizing the emitter electrode to generate a magnetic field from the first wellbore; and measuring the magnetic field from the second wellbore; completing the drilling of the second wellbore based on the measured magnetic field; injecting steam in the second wellbore to cause hydrocarbons in the formation to migrate to the first wellbore; and recovering hydrocarbons from the first wellbore. For any of the foregoing embodiments, the method may include any one of the following, alone or in combination with each other:

Selecting a reference point along the reference axis and positioning a return electrode on the surface at a location that substantially minimizes the distance between the return electrode and the reference point.

Interrupting drilling of the second wellbore prior to the step of measuring.

The return electrode is positioned on the surface at a location above the distal end of the first wellbore.

Establishing direct electrical contact between the emitter electrode and an elongated conductive member disposed in the first wellbore.

Transmitting current to the first wellbore through the formation adjacent the wellhead.

Repositioning at least one of the emitter electrode or the return electrode at the surface prior to the step of utilizing.

Repositioning both the emitter electrode and the return electrode at the surface prior to the step of utilizing.

Positioning an emitter electrode comprises positioning the emitter electrode adjacent the wellhead of the first wellbore and the return electrode above or beyond a distal end of the first wellbore.

Deploying an EM sensor on a drill string in the second wellbore.

Generating an alternating current at at least two excitation frequencies.

Generating an alternating current at a plurality of excitation frequencies.

Collecting magnetic field data, calculating a magnetic field gradient, and calculating a distance and direction between the first and second wells based on the magnetic field gradient.

Collecting magnetic field data comprises positioning the second wellbore to be substantially parallel to the first wellbore and acquiring magnetic field data from a plurality of points along the first wellbore.

Drilling the second wellbore to have an elongated axis substantially parallel to an elongated axis of the first wellbore.

Positioning the return electrode in a drill string in the second wellbore and insulating the return electrode from a magnetometer or magnetic gradient sensor on a drill string in the second wellbore.

Drilling a third wellbore proximate the distal end of the first wellbore and positioning a return electrode in the third wellbore.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

The invention claimed is:

1. A wellbore ranging system comprising:
a first wellbore having a first end proximate a wellhead at the surface of a formation and a second, distal end disposed along a portion of a reference axis coaxially extensive with at least a portion of the first wellbore, the reference axis having a reference point thereon, where the reference point is selected such that at least a portion of the first wellbore is between the wellhead and a location of the reference point, wherein an elongated conductive member is disposed within at least a portion of the first wellbore;
a current injection system comprising a source of alternating current at the surface, an emitter electrode, and a return electrode, wherein the emitter electrode is adjacent the wellhead and the return electrode is placed on the surface at a location that substantially minimizes the distance between the return electrode and the reference point and so that at least a portion of the first wellbore is between the wellhead and a location of the return electrode;
a second wellbore extending from the surface; and
an EM sensor disposed within the second wellbore.

2. The wellbore ranging system of claim 1, wherein the reference point is at the distal end of the first wellbore.

3. The wellbore ranging system of claim 1, wherein the reference point is at a location on the reference axis beyond the distal end of the first wellbore.

4. The wellbore ranging system of claim 1, further comprising a pipe string disposed within the second wellbore, the pipe string carrying a drill bit and the EM sensor.

5. A wellbore ranging system comprising:
a first wellbore having a first end proximate a wellhead at the surface of a formation and a second, distal end disposed along a portion of a reference axis coaxially extensive with at least a portion of the first wellbore, the reference axis having a reference point thereon, where the reference point is selected such that at least a portion of the first wellbore is between the wellhead and a location of the reference point, wherein an elongated conductive member is disposed within a portion of the first wellbore;
a current injection system comprising a source of alternating current at the surface, an emitter electrode, and a return electrode, wherein the emitter electrode is spaced apart from the wellhead and the return electrode is positioned at a location remote from the emitter electrode so that at least a portion of the first wellbore is between the wellhead and a location of the return electrode;
a second wellbore extending from the surface; and
an EM sensor disposed within the second wellbore.

6. The wellbore ranging system of claim 5, wherein both the emitter and return electrode are positioned on the surface.

7. The wellbore ranging system of claim 5, wherein both the emitter and return electrode are placed in the first wellbore.

8. The wellbore ranging system of claim 1 or 5, wherein the EM sensor comprises a gradiometer.

9. The wellbore ranging system of claim 1, wherein the reference point is at the distal end of the wellbore, the emitter electrode is adjacent the wellhead of the first wellbore and the return electrode is on the surface substantially above the reference point.

10. The wellbore ranging system of claim 1 or 5, wherein the emitter electrode is located at the surface and is in direct electrical contact with the elongated conductive member at a location in the wellbore or on the wellhead.

11. The wellbore ranging system of claim 1 or 5, wherein the emitter electrode is located at the surface in direct electrical contact with the formation adjacent the wellhead.

12. The wellbore ranging system of claim 1 or 5, wherein the return electrode is disposed at the surface above the distal end of the first wellbore.

13. The wellbore ranging system of claim 1, wherein the reference point is on the reference axis at a location beyond the distal end of the wellbore and the return electrode is disposed on the surface substantially above the reference point.

14. The wellbore ranging system of claim 5, wherein the return electrode is disposed in the second wellbore.

15. The wellbore ranging system of claim 14, wherein the return electrode is carried by the drill string in the second wellbore.

16. The wellbore ranging system of claim 15, wherein the drill string comprises an insulator between the return electrode and the EM sensor.

17. The wellbore ranging system of claim 1, wherein a first reference point is on the reference axis at a location beyond the distal end of the wellbore, a second reference point is on the reference axis at a location within the first wellbore, the emitter electrode is placed at the surface at a location that substantially minimizes the distance between the emitter electrode and the second reference point, and wherein the return electrode is disposed on the surface substantially above the first reference point.

18. A wellbore ranging method comprising:
drilling a first wellbore having a first end proximate a wellhead at the surface of a formation and a second, distal end disposed along a portion of a reference axis coaxially extensive with at least a portion of the first wellbore;
positioning an elongated conductive member within at least a portion of the first wellbore;
commencing the drilling of a second wellbore extending from the surface;
positioning a return electrode on the surface at a location so that at least a portion of the first wellbore is between the wellhead and the location of the return electrode;
positioning an emitter electrode at a location remote from the return electrode;
delivering an alternating current to the emitter electrode;
generating a magnetic field from the first wellbore utilizing the emitter electrode; and
measuring the magnetic field from the second wellbore.

19. The method of claim 18, further comprising selecting a reference point along the reference axis, and wherein positioning comprises placing the return electrode on the surface at a location that substantially minimizes the distance between the return electrode and the reference point.

20. The method of claim 18, further comprising interrupting drilling of the second wellbore prior to measuring the magnetic field from the second wellbore.

21. The method of claim 18, wherein the return electrode is positioned on the surface at a location above the distal end of the first wellbore.

22. The method of claim 18, wherein utilizing the emitter electrode comprises establishing direct electrical contact between the emitter electrode and the elongated conductive member.

23. The method of claim 21, wherein generating the magnetic field from the first wellbore comprises transmitting current to the first wellbore through the formation adjacent the wellhead.

24. The method of claim 18, further comprising repositioning at least one of the emitter electrode or the return electrode at the surface prior to generating the magnetic field from the first wellbore.

25. The method of claim 18, further comprising repositioning both the emitter electrode and the return electrode at the surface prior to generating the magnetic field from the first wellbore.

26. The method of claim 18, wherein positioning an emitter electrode comprises positioning the emitter electrode adjacent the wellhead of the first wellbore and the return electrode above or beyond a distal end of the first wellbore.

27. The method of claim 18, wherein measuring the magnetic field from the second wellbore comprises deploying an EM sensor on a drill string in the second wellbore.

28. The method of claim 18, wherein measuring the magnetic field from the second wellbore comprises collecting magnetic field data, calculating a magnetic field gradient, and calculating a distance and direction between the first and second wellbores based on the magnetic field gradient.

\* \* \* \* \*

UNITED STATES PATENT AND TRADEMARK OFFICE
CERTIFICATE OF CORRECTION

| | | |
|---|---|---|
| PATENT NO. | : 10,145,231 B2 | Page 1 of 1 |
| APPLICATION NO. | : 14/442356 | |
| DATED | : December 4, 2018 | |
| INVENTOR(S) | : Burkay Donderici and Clinton Moss | |

It is certified that error appears in the above-identified patent and that said Letters Patent is hereby corrected as shown below:

In the Specification

In Column 1, please delete Lines 16 through 22.

Signed and Sealed this
Fifth Day of March, 2019

Andrei Iancu
*Director of the United States Patent and Trademark Office*